US012746519B2

(12) United States Patent
Couch et al.

(10) Patent No.: US 12,746,519 B2
(45) Date of Patent: Sep. 29, 2026

(54) METHOD AND SYSTEM FOR FORMING A LIQUID MIXTURE

(71) Applicant: Legion P & A Tools L.L.C., Midland, TX (US)

(72) Inventors: John J. Couch, Midland, TX (US); Rocky Vines, Midland, TX (US)

(73) Assignee: Legion Innovations and Technologies LLC, Midland, TX (US)

( * ) Notice: Subject to any disclaimer, the term of this patent is extended or adjusted under 35 U.S.C. 154(b) by 941 days.

(21) Appl. No.: 18/050,101

(22) Filed: Oct. 27, 2022

(65) Prior Publication Data

US 2023/0077174 A1 Mar. 9, 2023

Related U.S. Application Data

(63) Continuation-in-part of application No. 17/542,280, filed on Dec. 3, 2021, now abandoned.

(Continued)

(51) Int. Cl.
*B01F 25/10* (2022.01)
*B01F 23/40* (2022.01)

(Continued)

(52) U.S. Cl.
CPC .......... *B01F 25/104* (2022.01); *B01F 23/405* (2022.01); *B01F 23/451* (2022.01); *B01F 23/51* (2022.01); *B01F 23/56* (2022.01); *B01F 35/213* (2022.01); *B01F 2025/914* (2022.01); *B01F 2101/04* (2022.01); *B01F 2101/06* (2022.01); *B01F 2101/22* (2022.01);

(Continued)

(58) Field of Classification Search
CPC ........... B01F 25/10; B01F 25/104; B28C 5/06
See application file for complete search history.

(56) References Cited

U.S. PATENT DOCUMENTS 2,316,705 A * 4/1943 Morgan .................. B28C 9/004 366/2
4,007,921 A 2/1977 Zingg (Continued)

FOREIGN PATENT DOCUMENTS

CA 2000984 C 11/1994
CN 101704275 A * 5/2010

(Continued)

OTHER PUBLICATIONS

International Search Report and Written Opinion dated May 8, 2023 in counterpart International PCT Patent Application No. PCT/US2022/080789, pp. 1-16.

*Primary Examiner* — Claire X Wang
*Assistant Examiner* — Patrick M McCarty
(74) *Attorney, Agent, or Firm* — Grady K. Bergen; Griggs Bergen LLP

(57) ABSTRACT

A method and system for forming a liquid mixture utilizes a mixing tank with a tank inlet oriented and configured to create a swirling liquid flow that forms a vortex within the tank. A portion of the swirling liquid is discharged through an outlet formed by an opening in a lower wall of the tank. At least a portion of the opening is offset to one side of a central axis of the lower wall. Liquid is circulated and reintroduced into the tank inlet. A material to be mixed is introduced into the swirling liquid flow within the tank interior to form a liquid mixture.

20 Claims, 20 Drawing Sheets

Related U.S. Application Data

(60) Provisional application No. 63/120,855, filed on Dec. 3, 2020.

(51) Int. Cl.

| | |
|---|---|
| ***B01F 23/451*** | (2022.01) |
| ***B01F 23/50*** | (2022.01) |
| ***B01F 35/213*** | (2022.01) |
| *B01F 25/00* | (2022.01) |
| *B01F 101/00* | (2022.01) |
| *B01F 101/04* | (2022.01) |
| *B01F 101/06* | (2022.01) |
| *B01F 101/22* | (2022.01) |
| *B01F 101/49* | (2022.01) |

(52) U.S. Cl.

CPC ... *B01F 2101/2204* (2022.01); *B01F 2101/49* (2022.01); *B01F 2215/0422* (2013.01); *B01F 2215/0427* (2013.01)

(56) References Cited

U.S. PATENT DOCUMENTS

| | | | | |
|---|---|---|---|---|
| 4,491,414 | A | 1/1985 | Hayatdavoudi et al. | |
| 6,796,704 | B1 | 9/2004 | Lott | |
| 7,428,797 | B2 | 9/2008 | Osipenko | |
| 2003/0165078 | A1 * | 9/2003 | Aggarwal | B01F 25/104 366/136 |
| 2008/0212397 | A1 | 9/2008 | Rondeau | |
| 2017/0122064 | A1 | 5/2017 | Rondeau | |
| 2020/0080391 | A1 * | 3/2020 | Marlatt | E21B 21/062 |
| 2020/0215502 | A1 | 7/2020 | Chong et al. | |
| 2024/0131482 | A1 * | 4/2024 | Däumler | B01F 27/112 |

FOREIGN PATENT DOCUMENTS

| | | | | |
|---|---|---|---|---|
| CN | 104029293 | A | 9/2014 | |
| DE | 102006016482 | A1 * | 11/2006 | B01F 33/3012 |
| GB | 1087812 | A * | 10/1967 | B28C 5/325 |
| GB | 2097285 | A * | 11/1982 | A61M 1/1668 |
| WO | WO1996014140 | A1 | 5/1996 | |

* cited by examiner

METHOD AND SYSTEM FOR FORMING A LIQUID MIXTURE

CROSS-REFERENCE TO RELATED APPLICATIONS

This application is a continuation-in-part of U.S. patent application Ser. No. 17/542,280, filed Dec. 3, 2021, which claims the benefit of U.S. Provisional Patent Application No. 63/120,855, filed Dec. 3, 2020, the disclosures of which are herein incorporated by reference in their entireties for all purposes.

TECHNICAL FIELD

This invention relates generally to the field of forming liquid mixtures and systems useful for forming such mixtures.

BACKGROUND

In various industries, liquid mixtures and slurries comprised of liquids and solid materials or two or more different liquids are formed for various purposes. For example, in oil and gas wells, oil and gas are accessed through a well which is typically drilled from the surface to the producing formation. Cement slurries may be deployed within a wellbore to provide structural support to the wellbore or to seal off the wellbore from the formation. When production of hydrocarbons from the well has slowed or stopped, usually after either well logs determine there is insufficient hydrocarbon potential to complete the well, or after production operations have drained the reservoir, a cement plug can be prepared to close the well. During the well closing process, cement plugs may be placed across any open hydrocarbon-bearing formations, across all casing shoes, across freshwater aquifers, or at areas near the surface, such as the top 20 to 50 feet of the wellbore.

In some instances, bridge plugs may be used in conjunction with cement slurries to ensure that higher density cement does not fall into the wellbore. Where bridge plugs are used, the bridge plug is set, and cement is pumped on top of the plug through drill pipe withdrawn before the slurry thickens.

Cement plugs used to close the wellbore are generally mixed by utilizing million dollars of large permanent cementing pumps and dry bulk trucks to mix large batches of cement slurries "on the fly." The cement pumps draw in water at a prescribed weight, and the dry bulk trucks blows off powder cement to combine and mix the water and powder cement. Conventional mixers may use a nozzle and a discharge line connected to a Venturi tube to introduce cement powder via a vacuum into the product flow for mixing. The conventional methods have small margins for error for the rates at which the water and dry bulk are combined and take a considerable amount of time to complete the mixing process. Errors in the mixing process can lead to costly delays and large amounts of wasted product due to larger batch size. If there are variations in the rates at which the water and dry bulk are added in the process, a cement slurry with an improper density can be produced causing job failure. In addition, after the mixing process is complete, conventional methods require a tank and agitator panel to prevent setting of the cement slurry. An improper cement slurry density and job failure can also result from a malfunction in the cement pump or the dry bulk truck which cause variations in the flow rates for the components.

Accordingly, improvements are needed in forming such cement slurries. There is also a need for improved methods for forming liquid mixtures for other industries and applications as well.

SUMMARY OF THE INVENTION

In a method of forming a liquid mixture, a liquid stream comprising at least a first liquid is introduced into a first mixing tank having a cylindrical, elliptic cylindrical, conical, frustoconical, spherical, or spheroidal upper wall with a conical, a frustoconical, spherical, or spheroidal lower wall that define a tank interior.

The liquid stream is introduced so that it is directed towards the upper wall of the mixing tank. The liquid stream is introduced through a tank inlet at a flow rate and an angle relative to the upper wall sufficient to create a swirling liquid within the tank interior. The swirling liquid forms a liquid vortex having a vortex core that is substantially free of liquid for at least a portion of the height of the mixing tank. A portion of the swirling liquid is withdrawn through an outlet formed in the lower wall and is circulated as all or a part of the liquid stream introduced into the tank inlet.

All or a major portion of the opening of the outlet is offset to one side of a central axis of the lower wall. A second material to be mixed is combined with the first liquid, the second material being mixed with the first liquid in the swirling liquid flow within the tank interior to form a first liquid mixture comprising the first liquid and second material.

A system for forming a liquid mixture is also provided. The system includes a mixing tank having a cylindrical, elliptic cylindrical, conical, frustoconical, spherical, or spheroidal upper wall with a conical, a frustoconical, spherical, or spheroidal lower wall that define a tank interior. The system also includes a pump having a pump intake and pump discharge for pumping liquids of the system at selected flow rates.

A tank inlet is in fluid communication with the pump discharge for introducing a liquid stream comprising at least a first liquid from the pump discharge into the tank interior. The tank inlet is configured to cause the liquid stream from the pump discharge at a first selected flow rate to be directed towards the upper wall of the first mixing tank to create a swirling liquid flow within the tank interior so that the swirling liquid forms a liquid vortex having a vortex core that is substantially free of liquid for at least a portion of the height of the mixing tank. A tank outlet is formed in the lower wall for withdrawing a portion of the swirling liquid within the tank interior.

All or a major portion of the opening of the outlet is offset to one side of a central axis of the lower wall. The tank outlet is in fluid communication with the pump intake of the pump for circulating the withdrawn portion as all or a part of the liquid stream introduced into the tank inlet. A second material inlet is in communication with at least one of the tank interior, the pump intake and the pump discharge so that the second material is introduced and mixed with the first liquid in the swirling liquid flow within the tank interior to form a liquid mixture comprising the first liquid and second material.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 1:
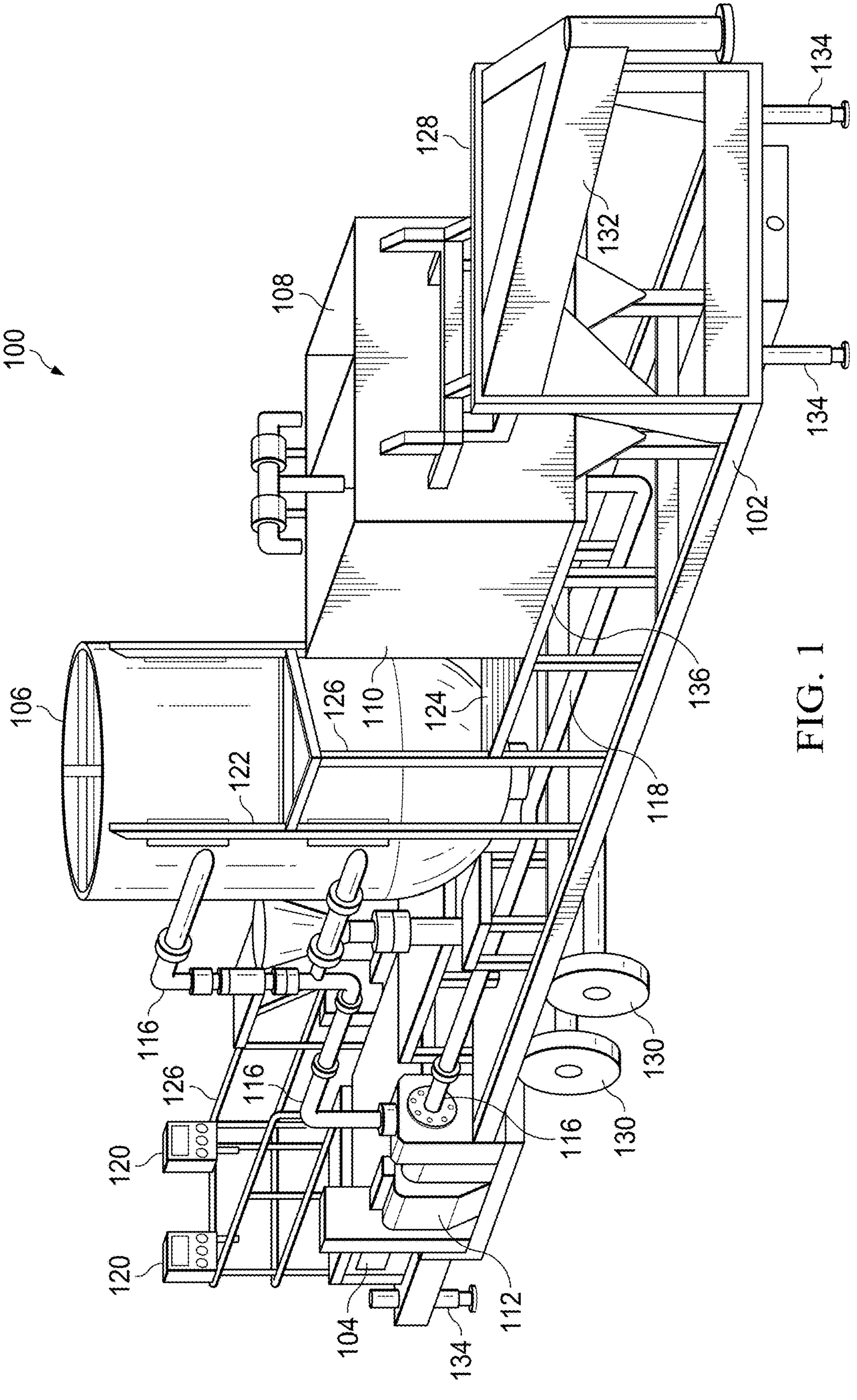
FIG. 1 depicts a perspective view of a mobile cement batch mixing plant constructed in accordance with a first embodiment.

Before explaining at least one embodiment of the inventive concepts disclosed, it is to be understood that the inventive concepts are not limited in their application to the details of construction and the arrangement of the components or steps or methodologies in the following description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth to provide a more thorough understanding of the inventive concepts. It will be apparent, however, to one of ordinary skill in the art that the inventive concepts within the disclosure may be practiced without these specific details. In other instances, well-known features may not be described to avoid unnecessarily complicating the disclosure.

Further, unless stated to the contrary or is apparent from its context, "or" refers to an inclusive "or" and not to an exclusive "or." For example, a condition A or B is satisfied by anyone of: A is true (or present), and B is false (or not present), A is false (or not present) and B is true (or present), and both A and B are true (or present). In addition, use of the "a" or "an" are employed to describe elements and components of the embodiments herein. This is done merely for convenience and to give a general sense of the inventive concepts disclosed. This description should be read to include one, or at least one, and the singular also includes the plural unless it is obvious that it is meant otherwise. As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

It should also be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventors appreciate and understand that any and all points within the range are to be considered to have been specified, and that inventors possess the entire range and all points within the range.

While the discussion that follows describes examples of methods and systems for mixing cement slurries, with which the invention has particular application, it should be understood that the same or similar methods and systems can be used for mixing other non-cement mixtures, as well. These may include liquid and solid mixtures and slurries and/or liquid/liquid mixtures, solutions, or emulsions.

Figure 2:
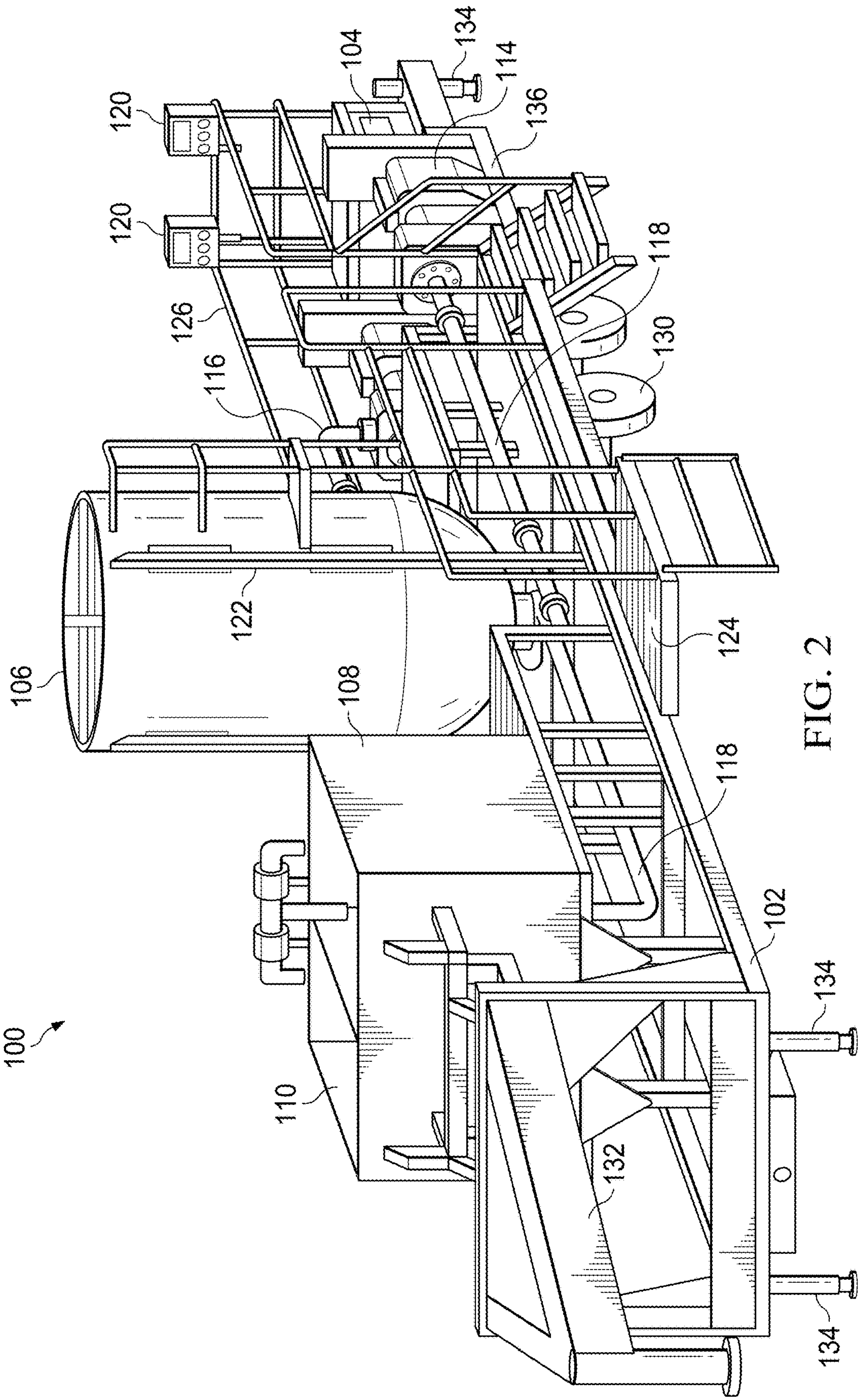
FIG. 2 is a second perspective view of the mobile cement batch mixing plant of FIG. 1.

In accordance with exemplary embodiments of the present invention, FIGS. 1 and 2 depict a mobile cement batch mixing plant 100 constructed in accordance with a first embodiment. The mobile cement batch mixing plant 100 can be transported to a wellsite and used to prepare a cement slurry. The cement slurry may be used to line the wellbore for support, seal off sections of the wellbore, or close off petroleum production from the wellbore. As used herein, the term "petroleum" refers broadly to all mineral hydrocarbons, such as crude oil, gas and combinations of oil and gas. The mobile cement batch mixing plant 100 includes a frame 102, which supports a power source 104, a slurry tank 106, a driver displacement tank 108, and a passenger displacement tank 110. The power source 104 powers a slurry pump 112 and a clean pump 114, which are also supported by the frame 102. The pumps 112, 114 pump water and slurry though the plumbing of the mobile cement batch mixing plant 100. The slurry tank 106 is used to prepare the cement slurry by mixing water and dry cement mix via a fluid vortex within the slurry tank 106 and recirculating the cement slurry through the slurry side plumping 116. Water for the cement slurry is held in the driver and passenger displacement tanks 108, 110 and communicated to the slurry tank 106 via the clean side plumping 118. The flow of water and cement slurry through the slurry side plumbing 116 and clean side plumping 118 is controlled via a set of pump controls 120 as well as valves within the slurry side plumbing 116 and clean side plumping 118.

In some embodiments the frame 102 may also include supports for 122. As shown in FIGS. 1 and 2, the supports are incorporated into the frame 102 and support the weight of the pumps, tanks, and other components of the mobile cement batch mixing plant 100. The frame 102 may also include platforms 124 and rails 126 which allow operators to access and control the various components of the mobile cement batch mixing plant 100. The platforms 124 and rails 126 may be configured to be removable from the frame 102. In addition, portions of the frame 102 may also be removable. The removal of portions of the frame 102, rails 126 and platforms 124 allows easier access to the mobile cement batch mixing plant 100, such as for repair. Other components of the mobile cement batch mixing plant 100, such as the pumps 112, 114, and tanks 106, 108, 110 may be configured with component skids 136 which allow the components of the mobile cement batch mixing plant 100 to be easily removed from the frame 102. This allows the mobile cement batch mixing plant 100 to be more easily repaired.

Components, platforms, and rails may also be removed from the frame 102 to prepare the mobile cement batch mixing plant 100 for transportation. The transportation of the mobile cement batch mixing plant 100 is effectuated via a transportation apparatus 128 attached to the frame 102. In the present embodiment the transportation apparatus 128 includes a set of wheels 130 and a hitch 132. The wheels 130 and hitch 132 allow the mobile cement batch mixing plant 100 to be attached to a trailer truck and transported between well sites. In other embodiments the transportation apparatus 128 may be comprised of other means to effectuate transportation such as a skid. When the mobile cement batch mixing plant 100 is deposited at a well site the wheels 130 and a series of stabilization jacks 134 contact the ground and support the frame 102. The stabilization jacks 134 can also be used to level the mobile cement batch mixing plant 100 to enable proper operation and mixing of the cement slurry.

Figure 3:
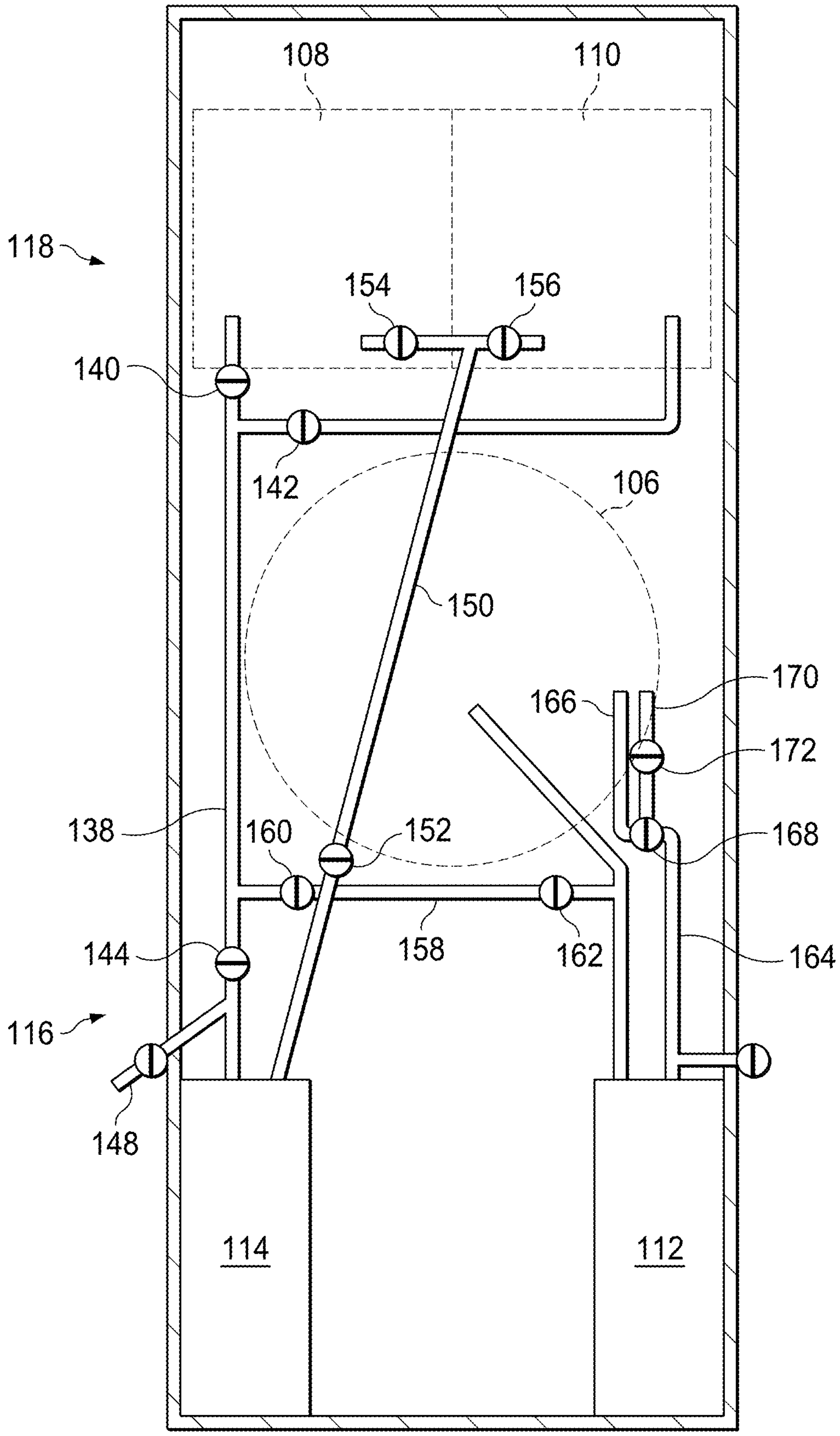
FIG. 3 is a plumbing synopsis of a mobile cement batch mixing plant constructed in accordance with the embodiment of FIG. 1.
Figure 4:
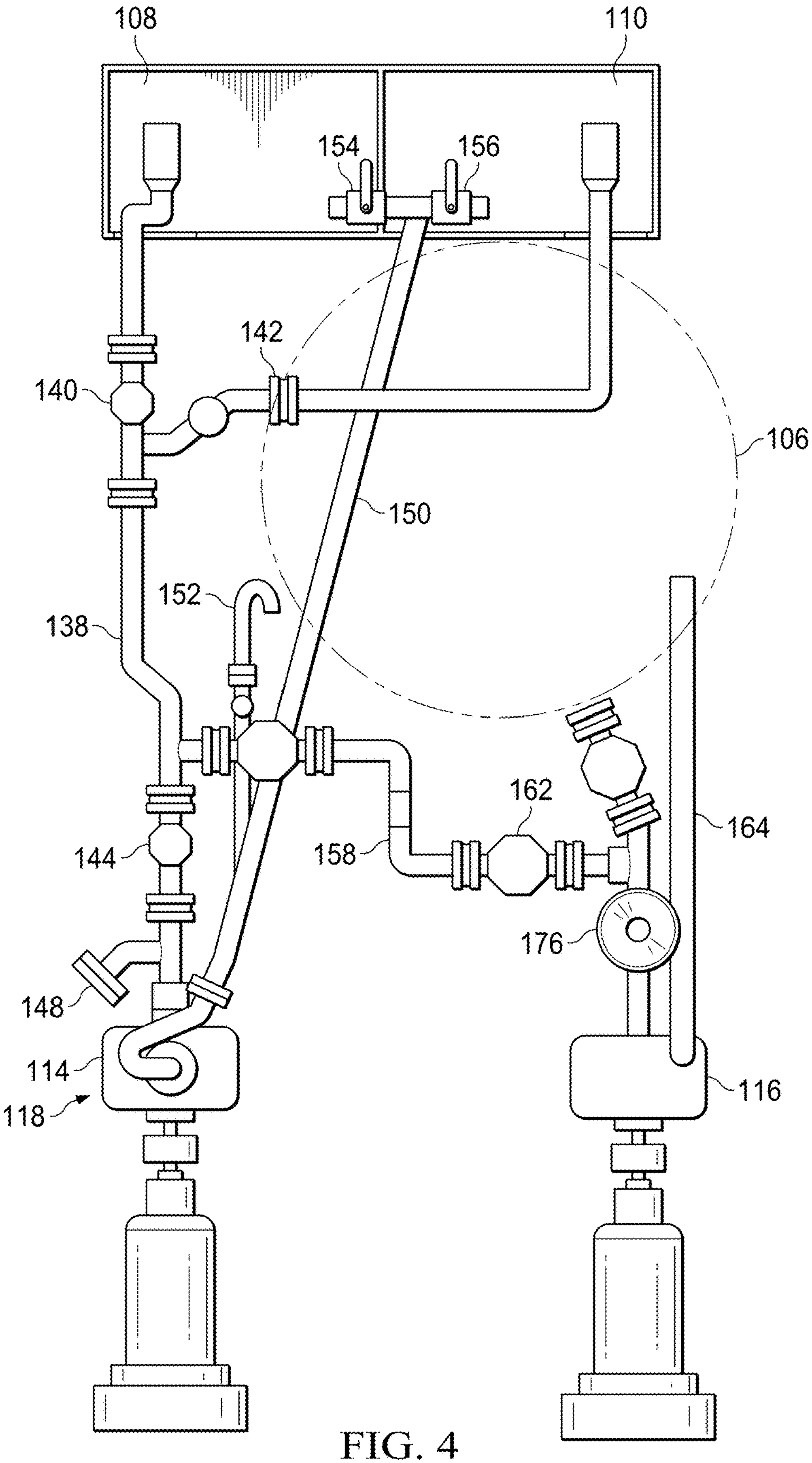
FIG. 4 is the plumbing system of a mobile cement batch mixing plant independent of the mobile cement batch mixing plant constructed in accordance with an embodiment of the present invention.
Figure 5:
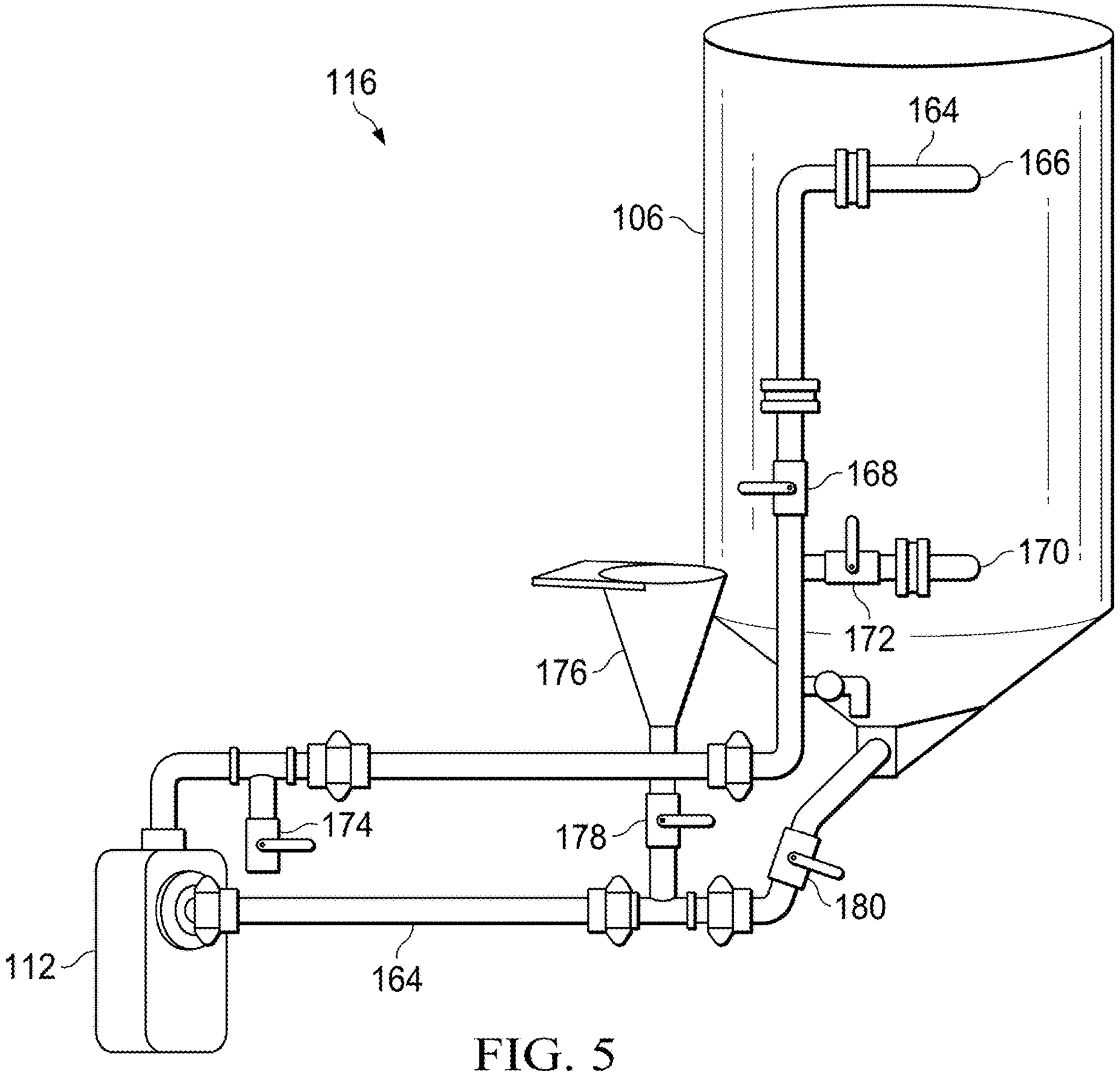
FIG. 5 is a slurry tank plumbing system independent of the mobile cement batch mixing plant constructed in accordance with an embodiment of the present invention.

Turning now to FIG. 3 shown therein is a plumbing synopsis of the mobile cement batch mixing plant 100 constructed in accordance with an embodiment of the present invention, showing how the displacement tanks 108, 110 may be connected to the slurry pump 112, clean pump 114, and slurry tank 106. Detailed views of an embodiment of the plumbing systems in the plumbing synopsis of FIG. 3 are shown in FIGS. 4 and 5. In addition to the connections between the above listed components, FIG. 3 also shows a configuration of valves incorporated to control the flow of fluid and to isolate portions of the plumbing.

Beginning with the clean side plumbing 118, as shown in FIG. 3, the displacement tanks 108, 110 are connected to the clean pump 114 via the clean suction supply line 138. The clean suction supply line 138 includes a T-fitting prior to reaching the displacement tanks 108, 110 and connects to each displacement tank 108, 110 independently. The clean suction supply line 138 connection to the driver displacement tank 108 is controlled with a driver isolation valve 140 while the clean suction supply line 138 connection to the passenger displacement tank 110 is controlled with a passenger isolation valve 142. The clean pump 114 can also be isolated from the displacement tanks 108, 110 with the displacement tank suction isolation valve 144.

Water can be loaded into the clean supply suction line 138 and clean side plumbing 118 at the connected freshwater load line 148. Water in the clean side plumbing 118 can also be recirculated back to the displacement tanks 108, 110 via a clean discharge line 150 which runs from the clean pump 114 to the displacement tanks 108, 110. The clean discharge line 150 can also be redirected to the slurry tank 106 for cleaning via a slurry tank clean fill valve 152 or candy cane valve located above the slurry tank 106. Water pumped back to the displacement tanks 108, 110 can be isolated to a specific tank via a driver discharge isolation valve 154 or a passenger discharge isolation valve 156. In this manner the level of water each displacement tank 108, 110 can be controlled and the amount of water sent to the slurry tank 106 can be easily measured.

In addition to providing volume control, the independent displacement tanks 108, 110 in conjunction with the independent slurry pump 112 and clean pump 114 allow for simultaneous slurry mixing and refilling of a displacement tank. This is possible because the plumbing systems allow the two processes to be isolated. Water can be added to the slurry side plumbing through one of the displacement tanks and the slurry pump 112, while the clean pump 114 is used to refill the other displacement tank. Through the clean side plumbing 118, the clean pump can be isolated on the suction side to draw on water to fill either compartment without interrupting the addition of water to the slurry side plumbing 116. This simultaneous interaction is more efficient and as indicated above also allows for accurate fluid displacement tracking.

As shown in FIG. 3, water can be pumped from the clean side plumbing 118 to the slurry side plumbing 116 via a clean crossover line 158. The clean crossover line 158 has two isolation valves, a crossover clean isolation valve 160 located closer to the clean supply suction line 138 and a crossover slurry isolation valve 162 located closer to the slurry side plumbing 116. These isolation valves can be used to isolate the clean and slurry side plumbing 118, 116. The clean crossover line 158 connects to the recirculation line 164 of the slurry side plumbing 116. The recirculation line 164 feeds into the slurry pump 112 which pumps fluid to the slurry tank 106.

Fluid or slurry can be pumped into the slurry tank 106 through either an upper tank recirculation port 166 or a lower tank recirculation port 170 in the slurry tank 106. The upper tank recirculation port 166 is located at a position higher on the slurry tank 106 than the lower tank recirculation port 170. The upper port 166 will generally be used when the fluid or slurry levels are higher in the slurry tank 106, while the lower port 170 will be used when the fluid or slurry levels are lower in the slurry tank 106. This selection of ports allows the operator to maintain a vortex and proper mixing when the mobile cement batch mixing plant 100 is in use. The operator can choose which port to recirculate to, generally contingent on fluid volume in slurry tank 106. Each port can be isolated from the recirculation line 164 via a corresponding valve. An upper tank recirculation port valve 168 and a lower tank recirculation port valve 172 allow the operator to control the flow of fluid or slurry into the slurry tank 106. The valves may specifically be trimmed to control the fluid vortex in the slurry tank 106. In other embodiments the slurry tank 106 may have additional or fewer ports. Still in other embodiments multiple ports may be used in conjunction to control the flow of fluid into the slurry tank 106.

Fluid that enters the slurry tank 106 through the recirculation ports 166, 170 returns to the recirculation line 164 via a sump port in the bottom of the slurry tank 106. In the present embodiment, the slurry tank 106 has a continuous curved upper wall that surrounds a vertical central axis and may be configured as a cylinder, with the upper wall having a circular transverse cross section along all or a portion of its height. In an alternate embodiment, the upper wall of the slurry tank 106 may be configured as an elliptic cylinder, wherein the upper wall has an elliptical or oval transverse cross section along all or a portion of its height. In some embodiments, the slurry tank 106 may have an upper wall that is conical, frustoconical, spherical (e.g., hemisphere, partial sphere, etc.), or spheroidal (e.g., partial spheroid). A lower wall of the slurry tank 106 joins the lower end of the upper wall and may have a conical, frustoconical, spherical (e.g., partial sphere, hemisphere, etc.), or spheroidal (e.g., partial spheroid) configuration, with the lower portion having a circular or elliptical transverse cross section along all or a portion of its height, the diameter or width of the lower wall decreasing towards its lower end. The curved configuration of the upper wall aids in the creation and maintenance of swirling fluid flow as a vortex and the sloped and/or curved lower portion also facilitates the creation and maintenance of the vortex, as well as promoting the flow of liquid back to the recirculation line 164.

Prior to connecting to the slurry pump 112 a slurry flow will pass a hopper feed valve 178, as shown in FIG. 5, connected to the recirculation line 164. The hopper feed valve 178 controls the addition of dry bulk to the recirculation line 164 via a hopper 176 (FIGS. 4 and 5). Once the dry bulk is added to the recirculation line 164 via the hopper 176, the slurry pump 112 pumps the fluid and dry bulk mixture to the slurry tank 106 to be mixed in the vortex and recirculated back to the recirculation line 164. In the present embodiment the hopper 176 is placed in the suction side of the slurry side plumbing 116. This placement utilizes the slurry pump 112 to draw in the dry cement directly into the pump at a high rate which creates shear. In other embodiments the hopper may be placed at other locations along the recirculation line 164.

This method of introducing dry cement into the system reduces the time to mix dry cement product into a viable cement slurry dramatically. The recirculation process described above continues until the slurry mixture is fully mixed and ready to be deployed. When the cement slurry is ready to be deployed, the slurry discharge 174 can be opened and the slurry can be pumped into the wellbore or to another desired location. In the present embodiment a slurry discharge 174 is connected to the recirculation line 164 between the slurry tank 106 and recirculation port valves 168, 172. In some embodiments the slurry discharge 174 is connected to a high-pressure pump (not shown) which will control the flow of slurry from the mobile batch cement mixing plant 100.

FIGS. 4 and 5 shows detailed views of the plumbing system of the mobile cement batch mixing plant 100. FIG. 4 shows an embodiment of a plumbing system of the mobile cement batch mixing plant. FIG. 5. shows the slurry side plumbing 116 system independent of the mobile cement batch mixing plant 100. In the present embodiment, the increased mixing efficiency of the mobile cement batch mixing plant 100 described above is able to introduce at least 94 pounds of Class C cement into the recirculation system in 17 seconds. As shown in FIG. 5 the mobile cement batch mixing plant 100 has been fitted with plumbing on the slurry side plumbing 116. This plumbing may be 4" plumbing and may be coupled with a 6"×6" slurry pump 112 to aid in a friction reduction to keep the slurry from heating up and thereby avoid flash setting the cement slurry batch. In other embodiments other dimensions may be used to achieve similar results.

Figure 6:
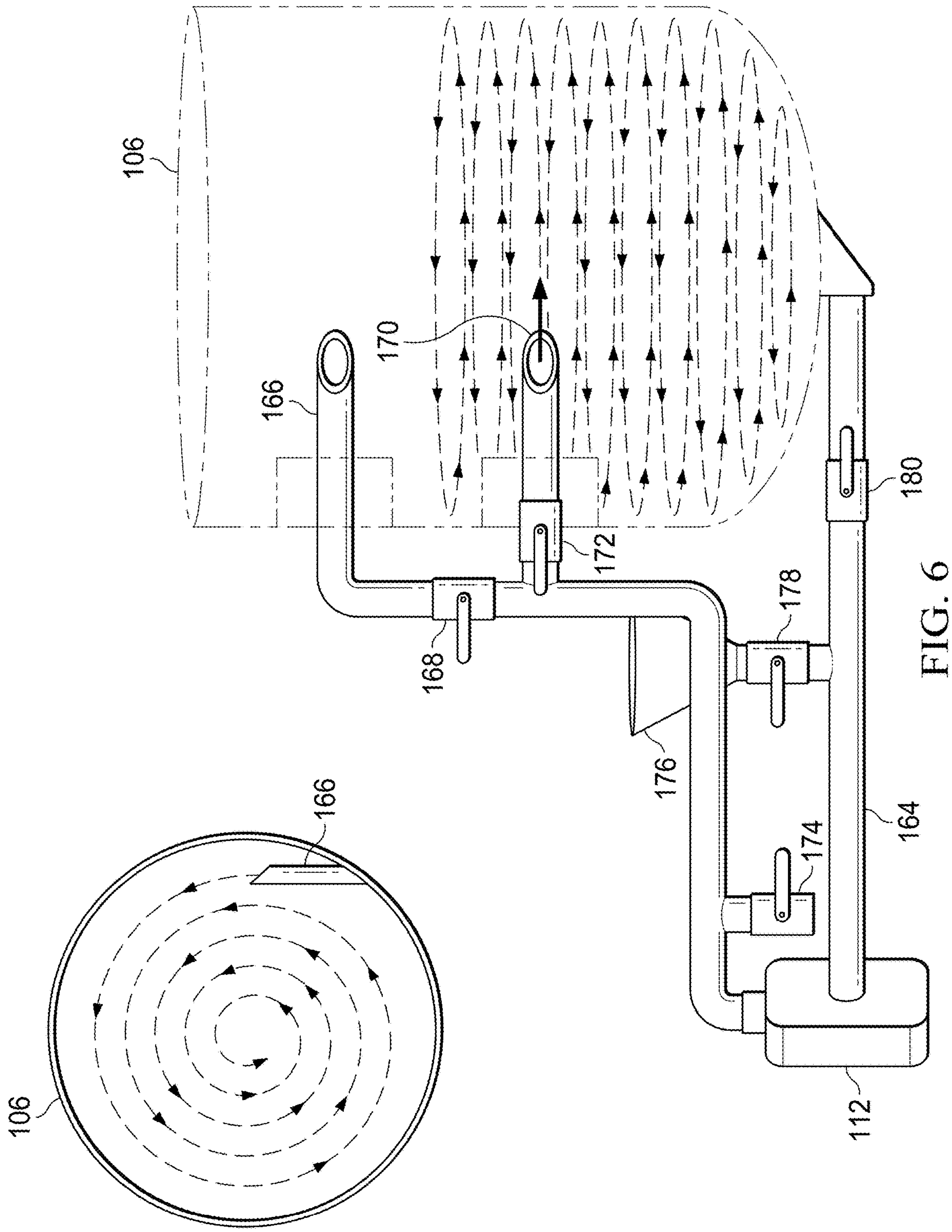
FIG. 6 is a slurry tank and attached slurry tank plumbing system with a fluid vortex induced by recirculation of a fluid slurry.

Turning now to FIG. 6 the slurry tank 106 and attached slurry side plumbing 116 with a fluid vortex in the slurry tank 106 induced by recirculation of a fluid slurry is shown. In FIG. 6, a slurry suction valve 180 is shown incorporated into the recirculation line between the slurry tank 106 and the slurry pump 112. The slurry tank 106 utilizes a cylindrical mixing tank to aid in the creation of a fluid vortex within the slurry tank 106. The recirculation ports 166, 170 on the side of the slurry tank 106 are placed at an angle relative to the wall of the slurry tank 106 to induce a swirling flow of fluid or liquid along the interior wall of the slurry tank 106, which also aids in the creation of a fluid vortex. These two characteristics of the slurry tank 106, along with the velocity of the fluid flow added by the slurry pump 112, cause the fluid to circle the interior of the tank at a high rate and create a fluid vortex. The fluid vortex mixes the dry bulk and water and removes the need for a mechanical agitator. In some embodiments the sump of the slurry tank 106 is also angled to incorporate the angle of flow and velocity of the vortex down into the recirculation line 164 toward the slurry pump 112.

Figure 7:
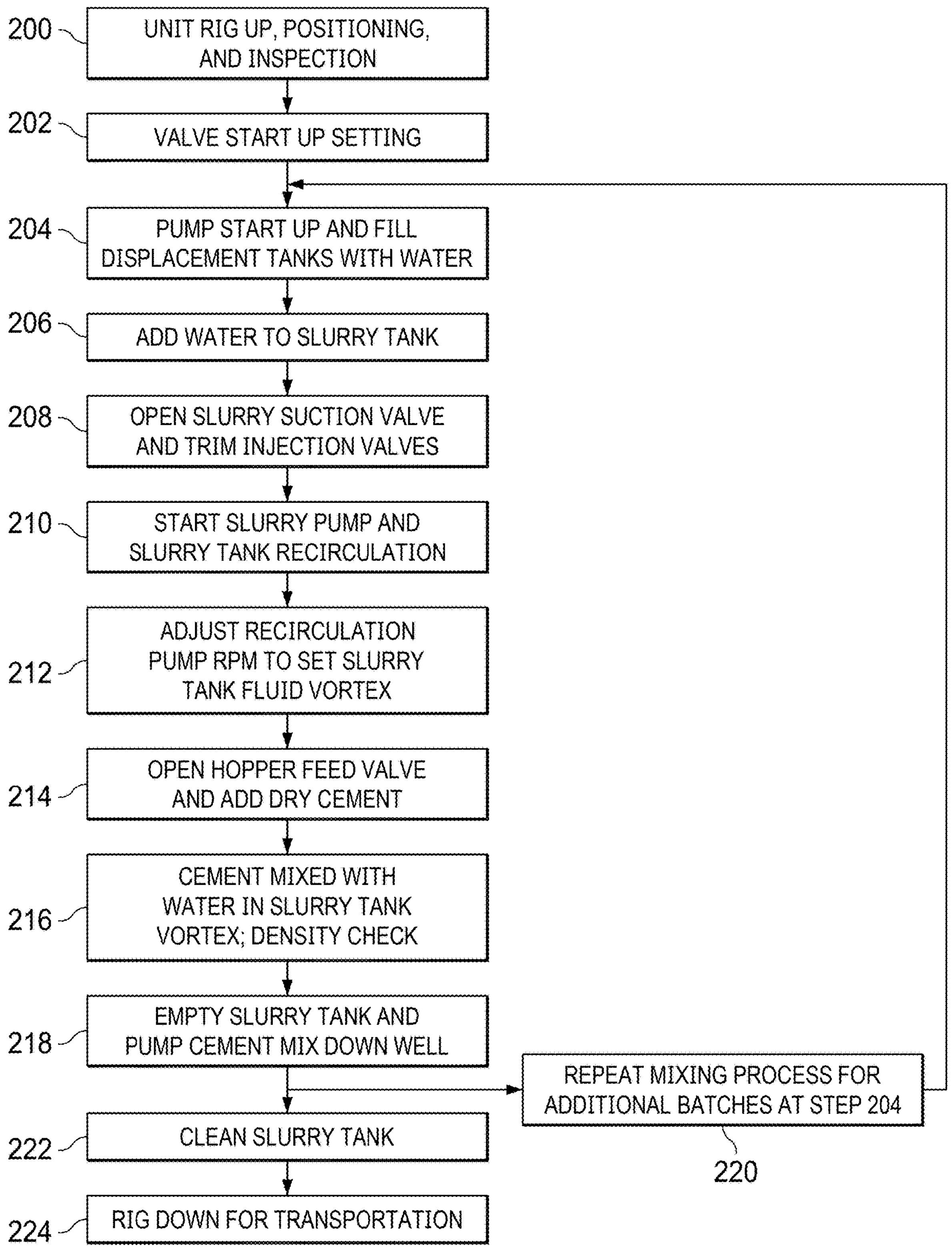
FIG. 7 is a process flow diagram for mixing a cement slurry with a mobile cement batch mixing plant constructed in accordance with an embodiment of the present invention.

Turning now to FIG. 7 shown therein is a process for mixing a cement slurry with a mobile cement batch mixing plant 100 constructed in accordance with an embodiment of the present invention. Beginning with step 200, the mobile cement batch mixing plant 100 starts the rig up process wherein the unit is spotted for optimal positioning on location. Stabilizing jacks 134 are then lowered and removable platforms 124, rails 126 and portions of the frame 102 are installed onto the mobile cement batch mixing plant 100. Suction and discharge hoses are then connected to the mobile cement batch mixing plant 100 and inspected. Fluid levels within the mobile cement batch mixing plant 100 are also checked during the rig up process. After rig up, the process proceeds to step 202 wherein the valves are set for pump start up. In the present embodiment, step 202 includes isolating the slurry side plumbing 116, closing the displacement tank suction isolation valve 144 and opening the driver and passenger discharge isolation valves 154, 156. The process can then proceed to step 204 wherein the clean pump 114 is started and the displacement tanks 108, 110 are filled from clean water line 148. Then in step 206 the slurry tank 106 can be filled via the slurry tank clean fill 152 or candy cane valve to the desired level from one or both of the tanks 108, 110. Once the slurry tank 106 is filled, the clean pump 114 can be disengaged and the slurry tank clean fill 152 can be closed.

Once the slurry tanks 106 are filled, the process can proceed to step 208 wherein the slurry suction valve 180 (FIG. 5) is opened and fluid communication in the recirculation line 164 is opened to the recirculation port valves 168, 172. A recirculation port valve can then be opened depending on the fluid level in the slurry tank 106. In the present embodiment, if the fluid volume is less than 15 barrels or below a selected level, the lower port valve 172 would be opened and the upper port valve 168 would be closed. If the fluid volume is over 15 barrels or above a selected level, the upper port valve 168 would be opened and the lower port valve 172 would be closed. In other embodiments, different slurry tank 106 volumes may correspond with different valve settings. Once the port valves are trimmed, the process proceeds to step 210 wherein the slurry pump 112 is engaged and recirculation through the recirculation line 164 and slurry tank 106 begins. In step 212, the rpm of the slurry pump 112 can be manipulated through the pump controls 120 to achieve the desired fluid vortex in the slurry tank 106 and the system is ready for the addition of dry cement.

In step 214, a set amount of dry cement corresponding to the fluid present in the slurry tank 106 and recirculation line 164 is added to the hopper 176. The cement then moves through an opened hopper feed valve 178 into the recirculation line 164. In step 216, the cement and water are then pumped into the slurry tank 106 and mixed by the fluid vortex and recirculated. Once sufficient mixing has occurred a sample of the cement slurry can be removed from the system and checked for the appropriate density. If the cement slurry density is appropriate, then in step 218 the slurry discharge 174 can be opened and the slurry can be pumped to a desired location. After the cement slurry has been pumped out of the slurry tank 106 and recirculation line 164 additional batches can be prepared by proceeding to step 220 wherein the slurry discharge 174 is closed, the slurry pump 112 is stopped and the process of mixing begins again by adding water to the slurry tank 106 and displacement tanks 108, 110, as previously described. This begins the process at step 204.

Alternatively, after the cement slurry has been pumped out to the desired location, the process can proceed to step 222 wherein the slurry tank 106 is cleaned. This process begins with closing the slurry discharge 174 and stopping the slurry pump 112. The crossover valves 160, 162 are then opened to allow water to flow into the slurry side plumbing 116 from the clean side plumbing 118. The slurry pump 112 can then be restarted which will draw water out of the driver displacement tank 108, provided that the driver isolation valve 140 is opened and the passenger isolation valve 142 is closed. When the driver displacement tank 108 is emptied, the driver isolation valve 140 can be closed and the passenger isolation valve 142 can be opened. This allows the slurry plump 112 to continue to pull clean water into the slurry side plumbing 116.

While the passenger displacement tank 110 is being emptied, the driver displacement tank 108 can be refilled through the clean discharge line 150, driver discharge isolation valve 154 and the clean pump 114. When the desired volumes are reached the slurry pump 112 and clean pump 114 can be stopped. The slurry side plumbing 116 can then be isolated via the crossover valves 160, 162 and additional water can be added to the slurry tank 106 via the slurry tank clean fill 152 or candy cane valve. The isolated slurry side plumbing 116 can then recirculate the clean water added to the slurry side plumbing 116 with the slurry side pump 112 to remove any cement slurry from the system through recirculating the clean water.

When the system has circulated enough water to remove the slurry, the slurry discharge 174 can be opened and the water slurry waste can be pumped to a cleanup pit. If desired, additional water from the displacement tanks 108, 110 can be flushed through the system by opening the crossover valves 160, 162 and driver and passenger isolation valves 140, 142, and engaging the clean pump 114. After the system has been flushed of water and slurry the process can proceed to step 224. In step 224, the mobile cement batch mixing plant 100 is rigged down. Components such as the rails 126, platforms 124 which can be removed for transportation are removed and hoses are disconnected from the system. Stabilizing jacks 134 are raised and the transportation apparatus is otherwise prepared for transport. In addition, the entire mobile cement batch mixing plant 100 is checked for roadworthiness.

Figure 8:
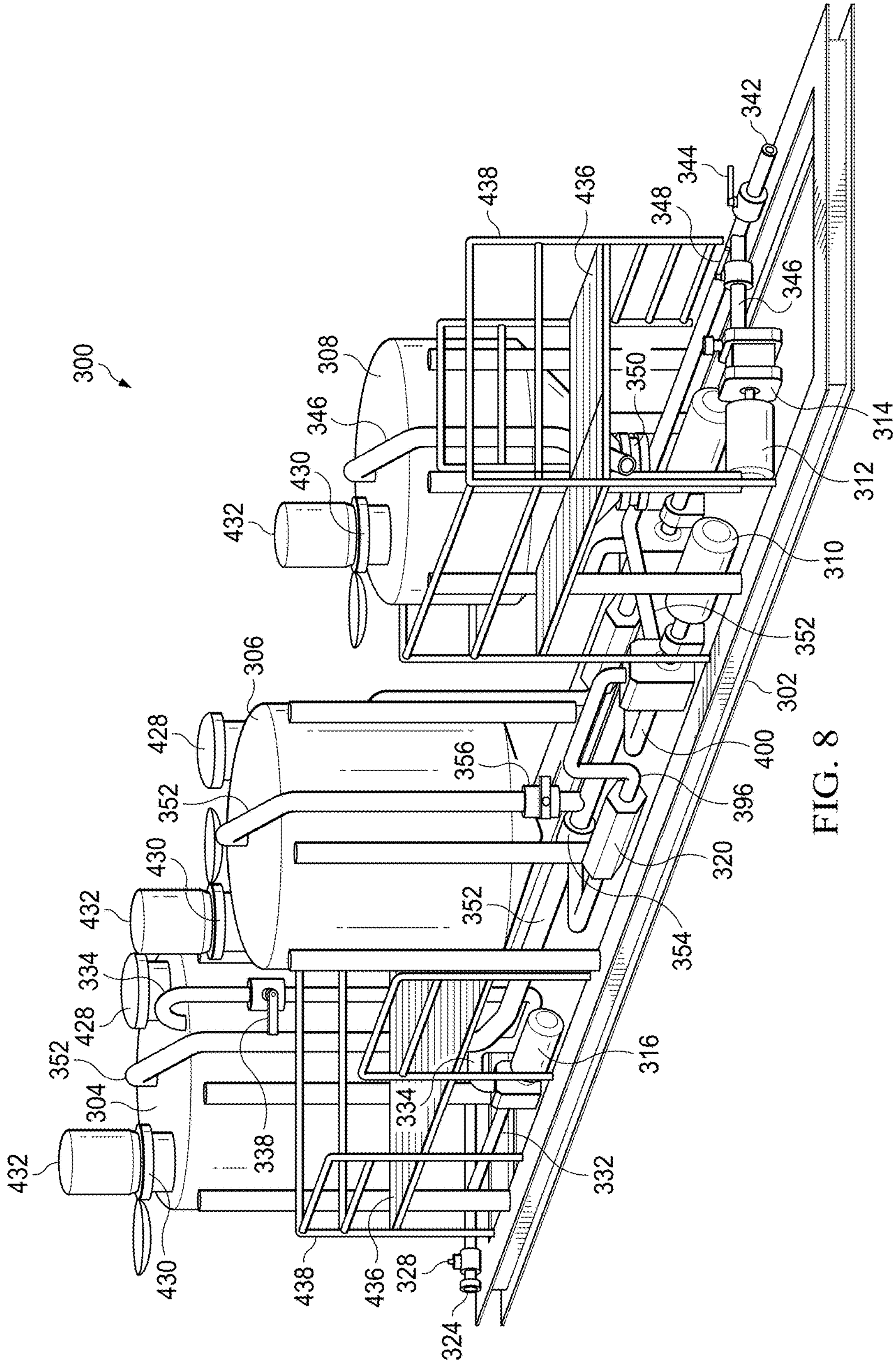
FIG. 8 is a perspective view of a mobile cement batch mixing plant constructed in accordance with a second embodiment.
Figure 9:
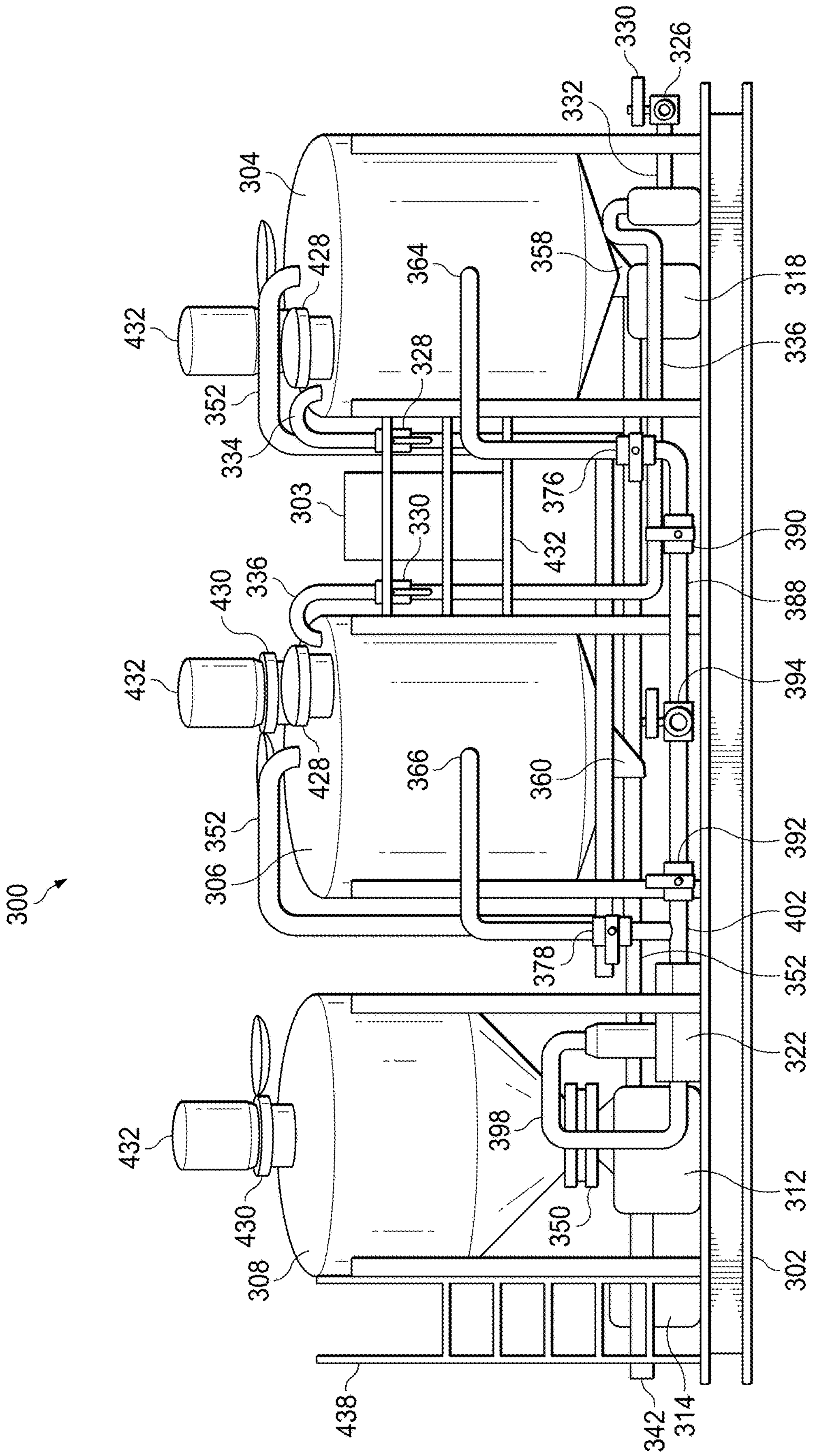
FIG. 9 is a second perspective view of the mobile cement batch mixing plant of FIG. 8.
Figure 10:
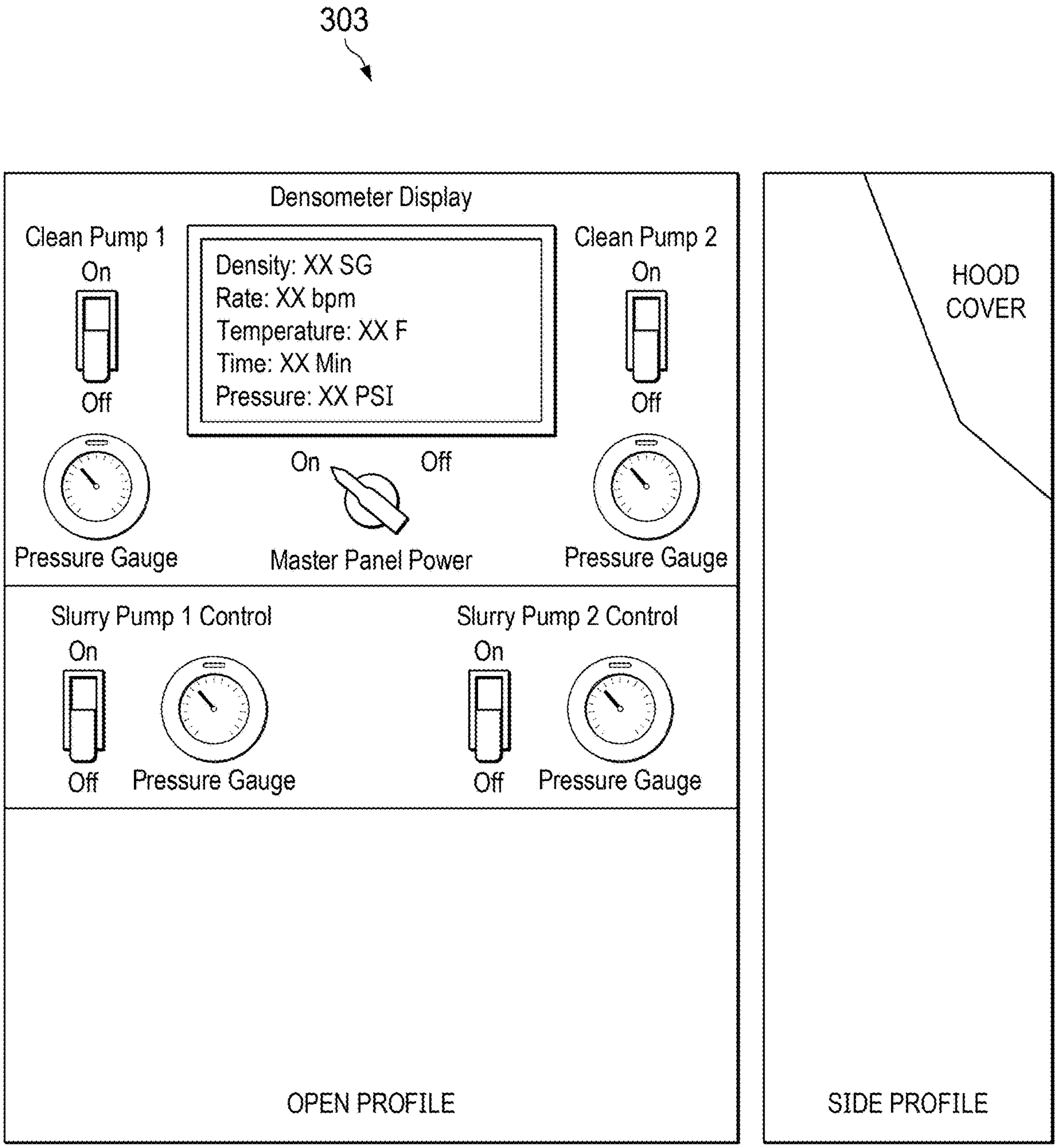
FIG. 10 is an exemplary depiction of a control unit.

In accordance with exemplary embodiments of the present invention, FIGS. 8 and 9 depict a mobile cement batch mixing plant 300 constructed in accordance with a second embodiment. Similar to the mobile cement batch mixing plant 100, the mobile cement batch mixing plant 300 can be transported to a wellsite and used to prepare a cement slurry. The cement slurry may be used to line the wellbore for support, seal off sections of the wellbore, or close off petroleum production from the wellbore. The mobile cement batch mixing plant 300 includes a frame 302, a control unit 303 (FIG. 10), a first slurry tank 304, a second slurry tank 306, and a cement storage tank 308. While two slurry tanks and one cement storage tank are depicted, it will be understood that one slurry tank may be used, more than two slurry tanks may be used, and more than one cement storage tank may be used as desired. It will be understood that equipping the mobile cement batch mixing plant 300 with multiple slurry tanks and associated pumping components provides additional redundancy and backup. The cement storage tank 300 may be optimally sized to hold at least 5,000 lbs of bulk storage, however, other sizes may be used as desired.

Although not depicted in FIGS. 8 and 9, the frame 302 may optionally be configured with transportation mechanisms, such as wheels and a hitch, or a skid like that of frame 102 of the mobile cement batch mixing plant 100. Additionally, it will be understood that stabilization jacks, legs, wheels, supports, and the like may be used to support the frame 302 during operation of the mobile cement batch mixing plant 300. Additionally, the frame 302 may also include platforms 436 and rails 438 which allow operators to access and control the various components of the mobile cement batch mixing plant 300. The platforms 436 and rails 438 may be configured to be removable from the frame 302. In addition, portions of the frame 302 may also be removable. The removal of portions of the frame 302, rails 438 and platforms 436 allows easier access to the mobile cement batch mixing plant 300, such as for repair.

Although not depicted, it will be understood that other components of the mobile cement batch mixing plant 300, as further described below, may be configured with component skids to allow each component of the mobile cement batch mixing plant 300 to be easily removed from the frame 302. This allows the mobile cement batch mixing plant 300 to quickly continue operation upon breakdown by switching faulty components. Components, platforms, and rails may also be removed from the frame 302 to prepare the mobile cement batch mixing plant 300 for transportation.

The mobile cement batch mixing plant 300 also may include a first slurry pump 310, a second slurry pump 312 (FIG. 9), a pneumatic pump 314, a first clean pump 316 (FIG. 8), and a second clean pump 318. The plant 300 may also include a first densometer 320 (FIG. 8) and a second densometer 322 (FIG. 9). The pneumatic pump 314 may be a 25 hp screw style pump capable of pumping air into the system at a 9-13 psi range or alternatively with a range of 6-8 cu ft (600-800 lbs.) a minute; however, it will be understood that other styles of pneumatic pumps and other sizes or hp ranges may be used. In certain embodiments, the clean pumps 318, 320 may be 3"×3" transfer pumps, and the slurry pumps 310, 312 may be a 6"×6" centrifugal pump; however, it will be understood that other sizes and types of pumps may be used for optimizing the flow of the liquids it the system. Additional pumps and densometers may be added as need to improve the circulation of the plumbing system, or as needed for additional slurry tanks or concrete tanks. The various pumps and densometers are powered and controlled by the control unit 303. An exemplary depiction of the control unit 303 is included in FIG. 10. In certain applications, all or at least one of the pumps used with the systems described herein may be electrically powered pumps. All or at least one of pumps may be a non-variable speed drive pump or a variable speed drive (VSD) pump.

Figure 11:
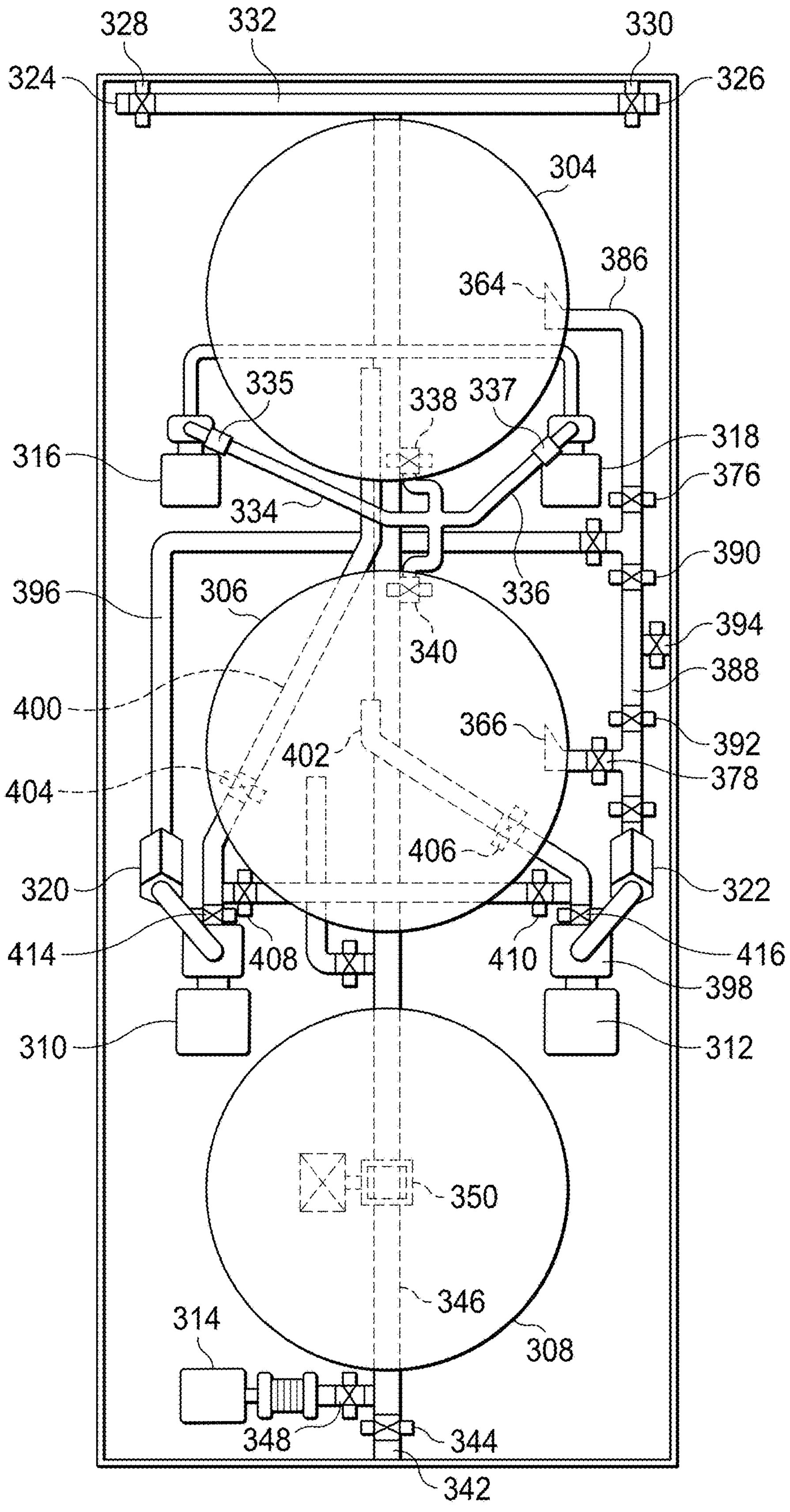
FIG. 11 is a plumbing synopsis of a mobile cement batch mixing plant constructed in accordance with an embodiment of FIG. 8.

As depicted in FIGS. 8, 9, and 11, the mobile cement batch mixing plant 300 includes a first water intake 324 and a second water intake 326 located on opposite sides of the frame 302 to allow water lines delivering water from a water source to be connected on either side of the plant 300. A first water intake valve 328 and a second water intake valve 330 are provided to allow either water intake 324, 326 to be used or to kill flow on one side or the other. It will be understood that additional intakes for water or other liquids may be used, or a single intake may be used as desired and may be located anywhere on the frame 302 as desired to provide easy hookup and distribution of the water. When water enters through one of the intake valves 328, 330 it flows into a clean water suction line 332. The water then enters the first clean pump 316 and/or the second clean pump 318. The water may be controlled via additional valves so that water only enters one of the clean pumps 316, 318.

After entering the first clean pump 314 and/or the second clean pump 316, the pumps may be used to selectively pump clean water into a first clean pump discharge line 334 and a second clean pump discharge line 336. A first clean pump isolation valve 335 and a second clean pump isolation valve 337 may be used to cut off water at the first clean pump 314 or second clean pump 316 respectively. A first clean pump discharge valve 338 and a second clean pump discharge valve 340 may also be used to control the flow of water into the first clean pump discharge line 334 and second clean pump discharge line 336 before the water reaches the first slurry tank 304 and/or second slurry tank 306 respectively.

The first slurry tank 304 and second slurry tank 306 may be configured to include an observation hatch 428 which may be opened while water is being initially pumped into the slurry tanks 304, 306. Although not depicted, the slurry tanks 304, 306 may include measurement lines inside the tank to allow a particular volume of water to be added. Once the required amount of water has been pumped into the slurry tanks, the observation hatch 428 may be closed.

After adding the desired amount of water to the slurry tanks 304, 306, the first slurry pump 310 and/or second slurry pump 312 are engaged to start recirculation of the fluid in the slurry tanks 304, 306. In particular, the first slurry tank 304 has a first sump 358 and the second slurry tank 306 has a second sump 360, each located at an opening at the bottom of the respective slurry tanks, which forms an outlet of the slurry tank. Each of the sumps 358, 360 or the opening to the sumps is configured or angled to intersect the lines of flow of the swirling vortex and velocity and deliver the slurry down into the suction side of the piping and back to the respective slurry pump 310, 312. Each of the sumps 358, 360 may be a trough sump or a sump box that is configured as a box-like structure having an open upper end that abuts against the bottom of the slurry tank and encompasses the opening or outlet of the slurry tank. All or a major portion of the sump or the opening or outlet in the bottom of the slurry tank may be offset to one side from the center or the central axis of each slurry tank 304, 306. It will be understood that the outlets of the slurry tanks 304, 306 or sumps 358, 360 or portions thereof could be at different locations offset to one side from the center or central axis of the slurry tanks 304, 306. The sumps 358, 360 may be sloped downward at an angle from greater than 0° to 60° from horizontal. This angle may also correspond to the slope of the lower wall of each tank 304, 306. A lower wall or bottom of the sump 358, 360 may also slope or extend along lines that slope downward from greater than 0° to 60°, more particularly from 10° to 45° from horizontal to an outlet of the sump to facilitate discharging of the material from the sump.

The first slurry pump 310 may be engaged to draw water through the first sump 358 into a first suction line 400 and into the first slurry pump 310. The water is then discharged from the first slurry pump 310 into a first discharge line 396, then into a first recirculation line 386, through a first recirculation port 364, and back into the first slurry tank 304. The second slurry pump 312 may be engaged to draw water through the second sump 360 into a second suction line 402 and into the second slurry pump 312. The water is then discharged from the second slurry pump 312 into a second discharge line 398, then into a second recirculation line 388, through a second recirculation port 366, and back into the second slurry tank 306. Each of these processes may be commenced simultaneously or alternatively.

The recirculation ports or tank inlets 364, 366 are placed on the sides of the slurry tanks 304, 306 below the upper liquid level of the tanks 364, 366 and are angled with respect to the walls of the tanks 304, 306 to induce the flow of fluid along the interior wall of the slurry tanks. In particular, the recirculation ports or inlets 364, 366 may enter the side of the slurry tanks 304, 306 or be configured to provide a fluid discharge at the inlet discharge at a 90° angle relative to the longitudinal axis of the tanks 304, 306. It will be understood that the inlets 364, 366 may be oriented to discharge fluid at an angle of from 20° to 160° relative to the longitudinal axis. Furthermore, the inlets 364, 366 may be oriented to provide an overall fluid discharge or direction of flow at the inlet discharge aimed or oriented along a flow line that intersects the tank wall at an angle of from 0° to 25° relative to a tangential line touching the tank wall at the point where the flow line intersects the tank wall.

The inlets 364, 366 may be configured as straight pipes or conduits that project into the interior of the tank 304, 306 a selected distance. This distance of projection may be from 0 to 0.35 times the diameter or width of the tank. The projecting pipes or conduits of the inlets 364, 366 may be cut or terminate at an angle at their ends to provide a beveled end or mule-shoe or partial mule-shoe configuration, with the beveled or elliptical face of the beveled end of the conduit facing toward the wall of the tank. In some embodiments, the angle of bevel may correspond to generally match or be parallel with the tangential angle where the fluid line of flow discharged from the inlet meets the slurry tank wall.

The cylindrical or curved shape of the slurry tanks 304, 306 also assist in moving the water within the tanks. Additionally, the slurry pumps 310, 312 may be set to operate at a specific RPM/velocity to optimize the flow and velocity of the water being recirculated through the plumbing system. The fluid dynamics on the inside of the slurry tanks 304, 306 create a high velocity swirling liquid vortex within the slurry tanks. These features eliminate the need for a mechanical agitator or other device typically needed in prior art systems to keep the fluid moving.

Once the desired fluid vortex of the water has been established, a bag hatch 430 located on each of the slurry tanks 304, 306 is opened and a micron bag or filter 432 may be secured. The micron bag or filter 432 may have a filtration rating of 30 microns, 20 microns or less. Next, the slurry side of the mobile cement batch mixing plant 300 may be engaged to add cement into the slurry tanks. The cement storage tank 308 is equipped to hold a dry cement product, which may be released into the system by trimming open or closed an electric slide gate valve 350 at the bottom of the tank. The pneumatic pump 314 may be utilized to blow air through an airline 346 and force the cement product into and through a feed line 352 to deliver it to the slurry tanks 304, 306. Once air from the pneumatic pump 314 is induced into the first and/or second slurry tanks 304, 306, the micron bag 432 inflates allowing air to escape while keeping silica from entering the atmosphere outside of the slurry tanks. It will be understood that additional bag hatches like that of bag hatch 430 and additional micron bags like that of micron bag 432 may be installed as needed to ensure enough air is released from the system and to ensure that dust and particles do not escape into the atmosphere.

The feed line 352 may include a first feed valve 354, located on the feed line 352 going into the first slurry tank 304, and a second feed valve 356, located on the feed line 352 going into the second slurry tank 306. Each of the feed valves 354, 356 may be opened or closed to control whether the dry cement product is delivered to the first slurry tank 304 and the second slurry tank 306 simultaneously, or to just one of the slurry tanks, 304, 306. Additionally, the feed valves 354, 356 may be used to control the amount of dry cement product entering the slurry tanks 304, 306. It will be understood that in some embodiments the plant 300 may be configured to move up to 800 lbs of cement a minute.

Alternatively, to the pneumatic pump 314, dry cement may be introduced through an auxiliary line 342 from an offboard bulk cement storage blower system (not depicted). If the auxiliary line 342 is used, a pneumatic pump isolation valve 348 may be used to close off the air line to the pneumatic pump 314. If the pneumatic pump 314 is used, an auxiliary valve 344 may be used to close off the auxiliary line 342.

Figure 12:
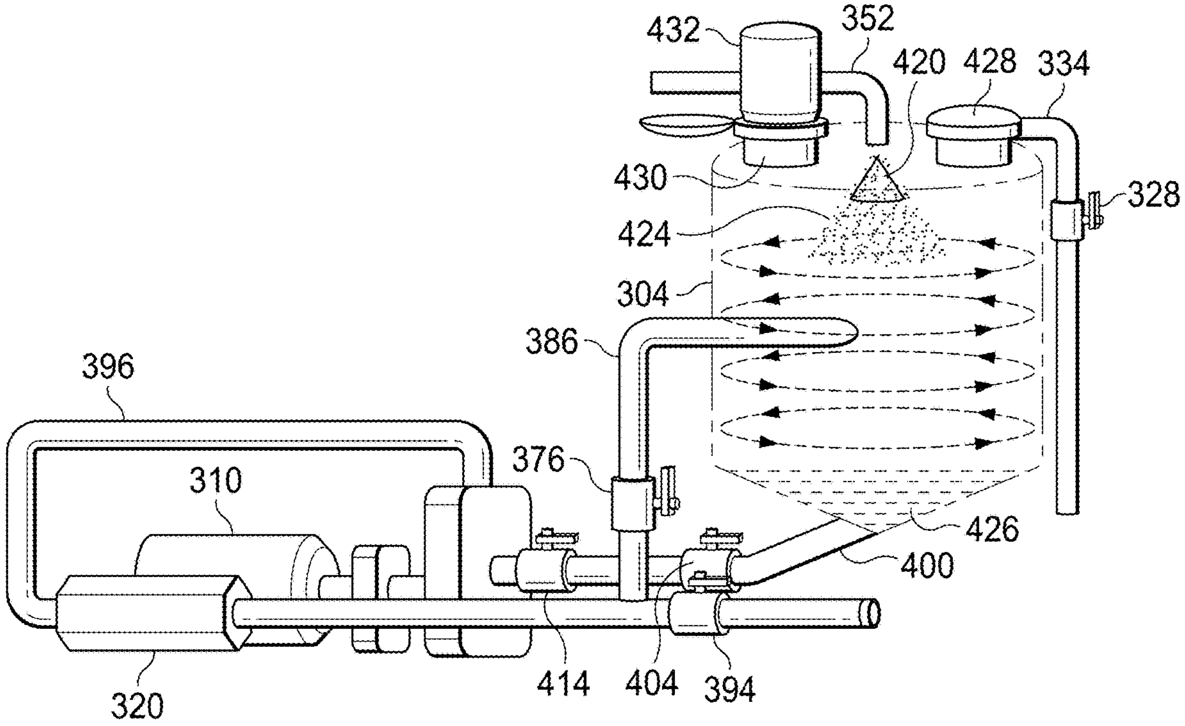
FIG. 12 is a slurry tank and attached slurry tank plumbing system with a fluid vortex induced by recirculation of a fluid slurry.
Figure 13:
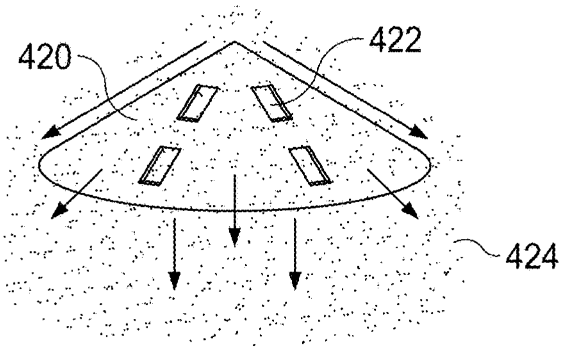
FIG. 13 is an exemplary depiction of a dispersing cone.

As depicted in FIGS. 12 and 13, the dry cement, shown as 424, is inducted through the feed line 352 and then through a dispersing cone 420 inside the respective slurry tank 304 or 306. The dispersing cone 420 may include several slots 422 to allow the dry cement 424 to fan in a 360-degree span into the higher velocity points within the liquid vortex. This mitigates clumping issues and helps the dry cement 424 mix with the water efficiently. The dispersing cone 420 is conical shaped and preferably sized to be 6"×6", however, it will be understood that other sizes may be used to optimize the disbursement of the dry cement 424 into the respective slurry tanks 304, 306.

While the dry cement 424 is being mixed with the water in the slurry tanks 304, 306, the newly created slurry mixture 426 is still being circulated through the system to maintain the fluid vortex within the slurry tanks 304, 306. The slurry mixture 426 passes through the first sump 358 into the first suction line 400 and into the first slurry pump 310. The slurry mixture 426 is then discharged from the first slurry pump 310 into the first discharge line 396, through the first densometer 320, then into the first recirculation line 386, through the first recirculation port 364, and back into the first slurry tank 304.

The second slurry pump 312 may also be engaged to draw the slurry mixture 426 through the second sump 360 into the second suction line 402 and into the second slurry pump 312. The slurry mixture 426 is then discharged from the second slurry pump 312 into the second discharge line 398, then into the second recirculation line 388, through the second densometer 322, through the second recirculation port 366, and back into the second slurry tank 306.

It will be understood that the various valves described herein may be trimmed allowing either slurry pump 310, 312 to mix either slurry tank 304, 306 in the event of a pump failure. In normal operations, the system can be used by alternating slurry tanks or by simultaneously mixing both slurry tanks 304, 306. During recirculation, the density of the slurry mixture 426 in each slurry tank 304, 306 may be constantly measured via the densometers 320, 322 and displayed on the control unit 303 to determine when the target density is reached. The densometers 320, 322 may be non-nuclear densometers, such as those commercially available from Red Meters LLC, Orlando, Florida, for continuous reading of the slurry density as it is being circulated.

Once the target density of the slurry mixture 426 has been reached, the pneumatic pump 314 or the auxiliary line 342 blower system will be turned off to stop dry cement from being blown into the slurry tanks 304, 306. A sample can then be taken of the slurry mixture 426 to verify target density with a pressurized mud scale to confirm that the target density has been achieved.

After verification of the target density, a first slurry discharge valve 390 and an offboard discharge valve 394 may be opened, and an offboard high pressure pump (not depicted) may be used to draw the slurry mixture 426 out of the first slurry tank 304 and down into the well. Additionally, a second slurry discharge valve 392 and the offboard discharge valve 394 may be opened to allow the offboard high pressure pump to draw the slurry mixture 426 out of the second slurry tank 306 and down into the well.

Once the slurry mixture 426 has been pumped off board, the observation hatch 428 may be opened and water may be drawn into the respective slurry tanks 304, 306 to displace the slurry mixture 426 to either clean out the systems or add the desired volume of water to mix the next cement slurry mixture batch. After the operation has been completed and the system has been cleaned and emptied, the observation hatch 428 and bag hatch 430 are closed and secured to prepare for transit of the mobile cement batch mixing plant 300. Additionally, the micron bag 432 is stored to keep it clean and dry.

Figure 14:
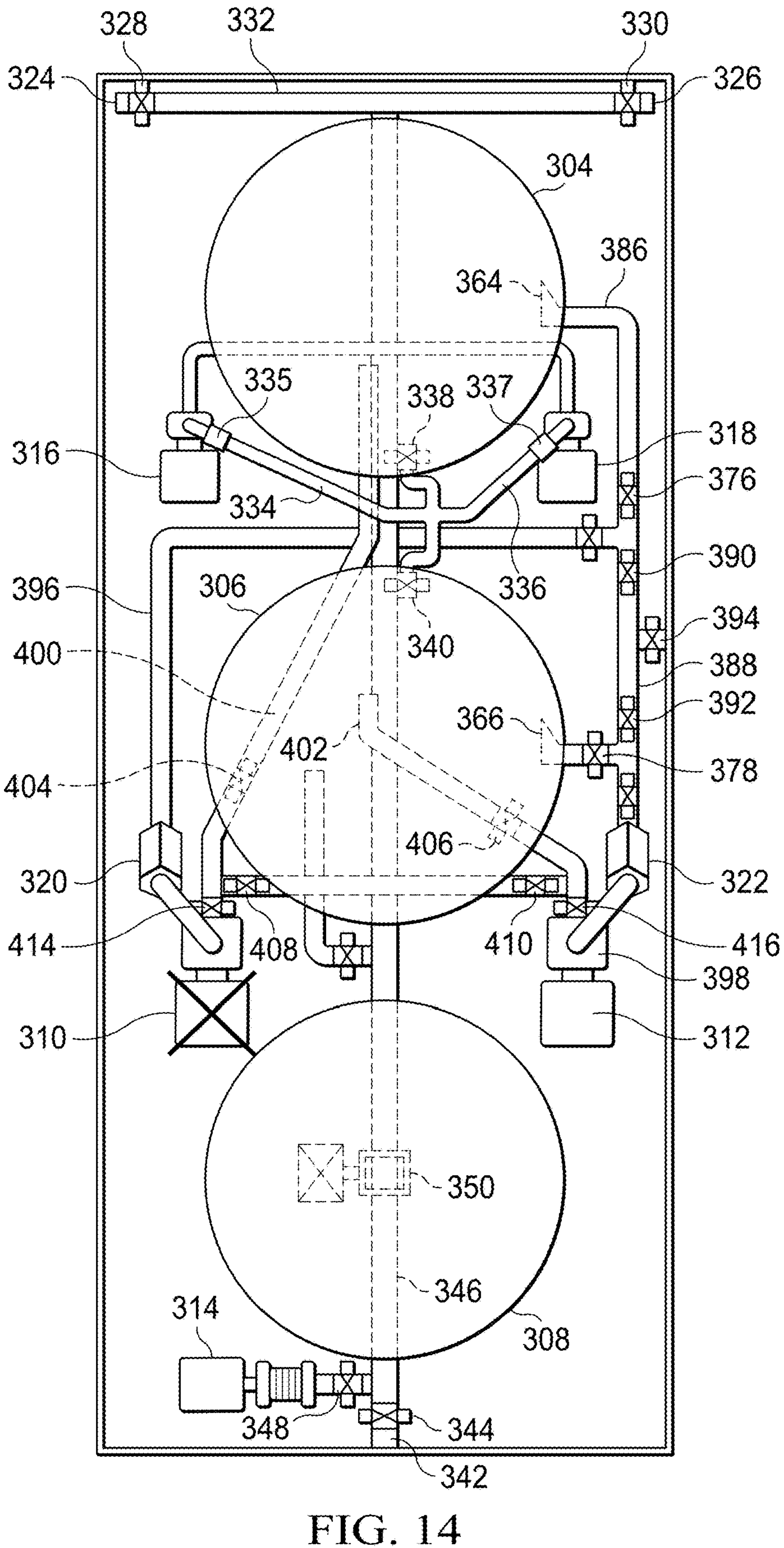
FIG. 14 is a plumbing synopsis of a mobile cement batch mixing plant constructed in accordance with an embodiment of FIG. 8.

Turning now to FIG. 14, it will be understood that if one of the slurry pumps 310, 312 fails, the valves may be trimmed to recirculate the fluid (water or slurry mixture) through the working slurry pump. For example, if the first slurry pump 310 fails, a first suction isolation valve 404, a first cross over isolation valve 408, a second cross over isolation valve 410, a second slurry pump isolation valve 416, the second slurry discharge valve 392, the first slurry discharge valve 390, and the recirculation valve 376 may be trimmed open. Also, the off-board discharge valve 394, the recirculation valve 378, the second suction isolation valve 406, and the first slurry pump isolation valve 414 may be trimmed closed. Trimming the valves in this way allows fluid to flow and recirculate from the first slurry tank 304 through the second slurry pump 312 and back into the first slurry tank 304 and prevents fluid from traveling through the first slurry pump 310. A similar process may be used if the second slurry pump 312 fails.

Figure 15:
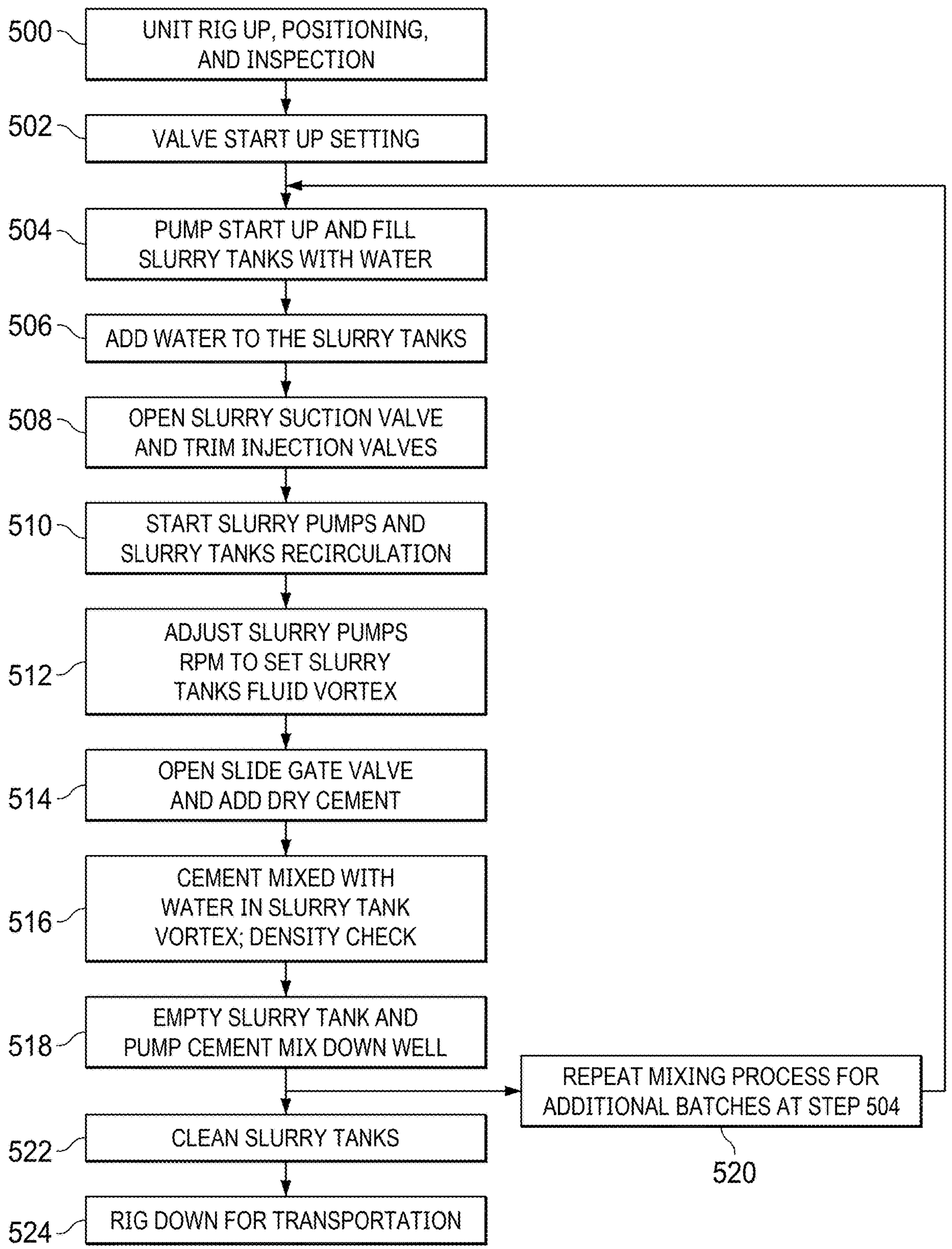
FIG. 15 is a process flow diagram for mixing a cement slurry with a mobile cement batch mixing plant constructed in accordance with an embodiment of the present invention.

Turning now to FIG. 15 shown therein is a process for mixing a cement slurry with a mobile cement batch mixing plant 300 constructed in accordance with an embodiment of the present invention. Beginning with step 500, the mobile cement batch mixing plant 300 starts the rig up process wherein the unit is spotted for optimal positioning on location. Stabilizing jacks 134 are lowered and removable platforms 436, rails 438 and portions of the frame 302 are installed onto the mobile cement batch mixing plant 300. Suction and discharge hoses are then connected to the mobile cement batch mixing plant 300 and inspected. Fluid levels within the mobile cement batch mixing plant 300 are also checked during the rig up process. After rig up, the process proceeds to step 502 wherein the valves are set for pump start up. In the present embodiment step 502 includes isolating the slurry side plumbing by closing the first suction isolation valve 404 and second suction isolation valve 406 and opening the first water intake valve 328 and the second water intake valve 330. The process can then proceed to step 504 wherein the first clean pump 316 and the second clean pump 318 are started and the slurry tanks 304, 306 are filled with water according to step 506. Once the slurry tanks 304, 306 are filled, the clean pumps 316, 318 can be disengaged and the water intake valves 328, 330 can be closed.

Once the tanks are filled, the process can proceed to step 508 wherein the first suction isolation valve 404 and second suction isolation valve 406 are opened and fluid communication in the first recirculation line 386 and second recirculation line 388 are opened to the recirculation valves 376, 378. The process proceeds to step 510 wherein the slurry pumps 310, 312 are engaged and recirculation through the recirculation lines 386, 388 and slurry tanks 304, 306 begins. In step 512 the RPM of the slurry pumps 310, 312 may be manipulated through the control unit 303 to achieve the desired fluid vortex in the slurry tanks 304, 306 and the system is ready for the addition of dry cement.

In step 514, the pneumatic pump 314 or auxiliary line 342 are activated to push air into the system and the electronic slide gate valve 350 of the cement tank 308 is trimmed open to allow dry cement to move into the feed line 351 and into the slurry tanks 304, 306 through the disbursement cone 420. In step 516 the cement and water are then mixed by the fluid vortex and recirculated. Once sufficient mixing has occurred a sample of the cement slurry can be removed from the system and checked for the appropriate density. If the cement slurry density is appropriate, then in step 518 the slurry discharge valves 390, 392 may be opened and the slurry can be pumped to a desired location, such as down the well. After the cement slurry has been pumped out of the slurry tanks 304, 306 additional batches can be prepared by proceeding to step 520 wherein the slurry discharge valves 390, 392 are closed, the slurry pumps 310, 312 are stopped and the process of mixing begins again by adding water to the slurry tanks 304, 306 in step 504.

Alternatively, after the cement slurry has been pumped out to the desired location, the process can proceed to step 522 wherein the slurry tanks 304, 306 are cleaned. This process begins with closing the slurry discharge valves 390, 392 and stopping the slurry pumps 310, 312. The first clean pump 316 and the second clean pump 318 are started and the slurry tanks 304, 306 are filled with water and water is recirculated through the system and tanks for cleaning and flushing.

After the system has been flushed of water and slurry, the process can proceed to step 524, wherein the mobile cement batch mixing plant 300 is rigged down. Components such as the rails 438, platforms 436, and other items which can be removed for transportation are removed, the observation hatch 428 and bag hatch 430 are closed, and hoses are disconnected from the system.

Figure 16:
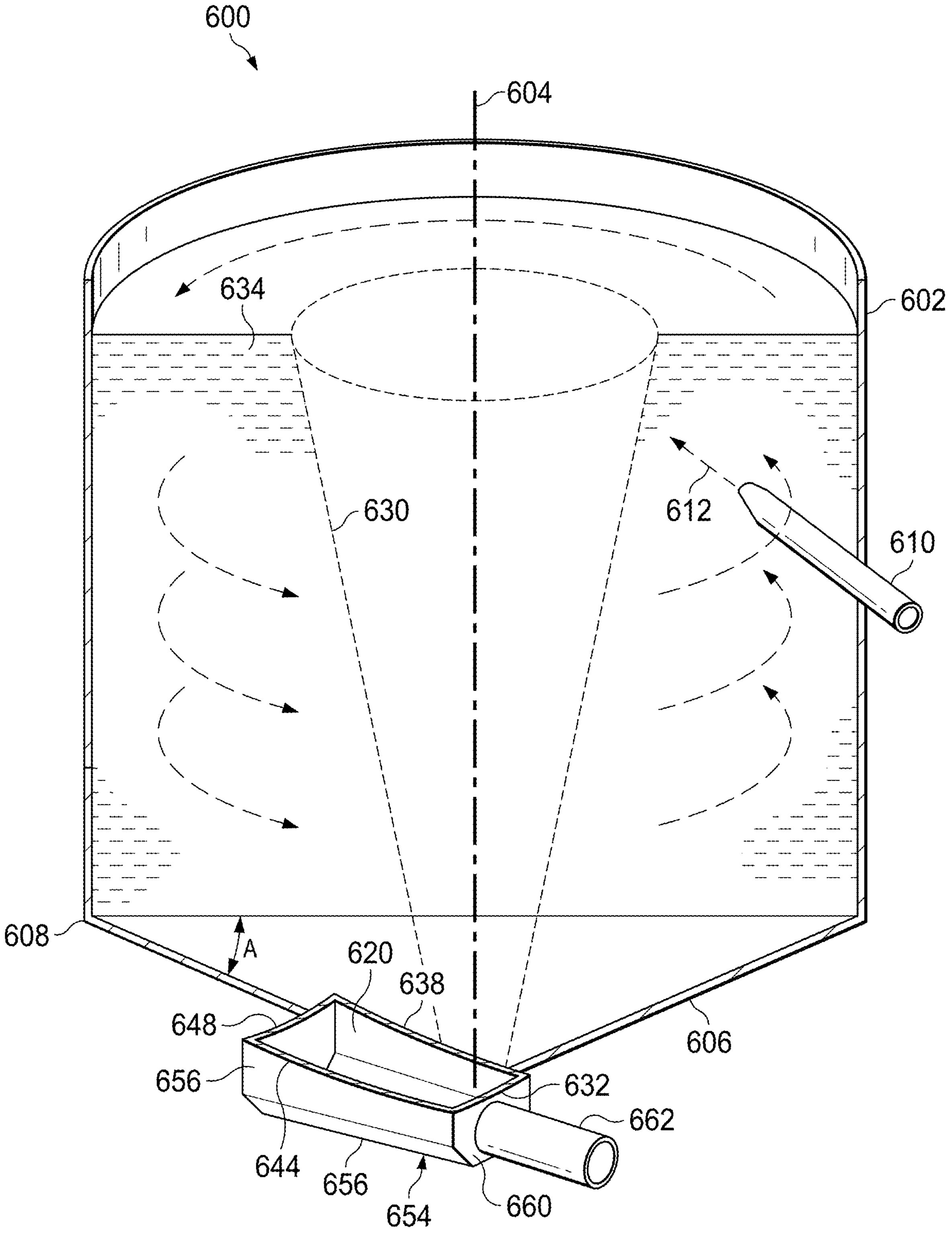
FIG. 16 is an elevational cross-sectional view of a mixing tank for mixing liquids and constructed in accordance with particular embodiments of the invention.
Figure 17:
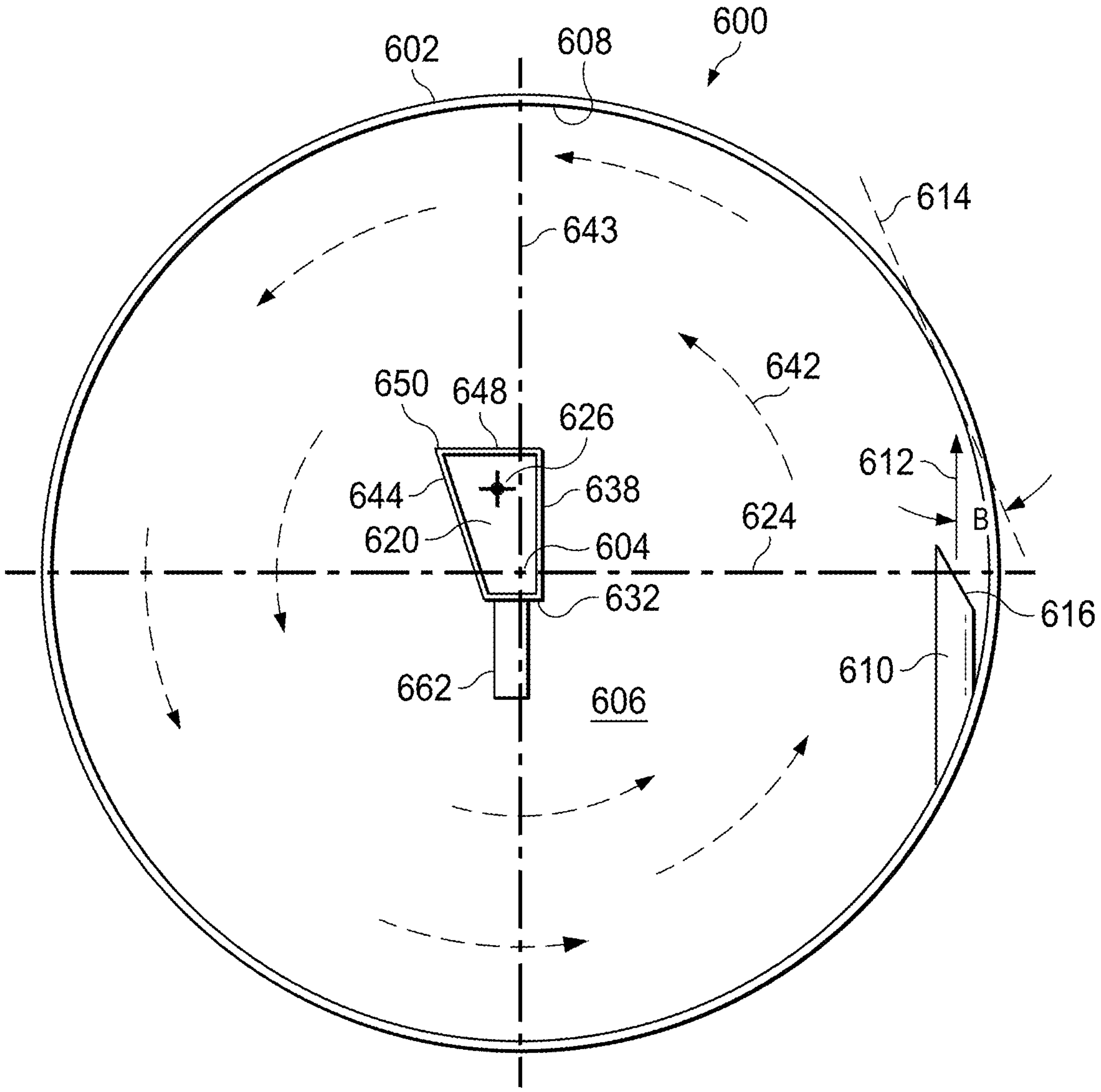
FIG. 17 is a top plan view of the mixing tank of FIG. 16.

Referring to FIGS. 16 and 17, a more detailed view of a mixing tank 600 for forming liquid mixtures or slurries is shown. The mixing tanks 106, 304, and 306 previously described may be configured the same or similarly to the mixing tank 600. All or portions of the mixing tank 600 and/or the various components used therewith may be metal materials, such as steel, stainless steel, iron, copper, aluminum, etc., which may be coated or uncoated. Composite, polymeric, or non-metal materials may also be used for all or portions of the tank 600 and the various components use with it, as well, such as fiberglass, PVC, polypropylene, polyethylene, etc.

As shown, the mixing tank 600 includes an upper portion formed by a continuous upper wall 602 that surrounds a central longitudinal axis 604 of the tank 600 that extends along the height or length of the tank 600. In most instances, the axis 604 will be oriented vertically or near vertical (i.e., ≤5° from vertical). The upper wall 602 is curved, having a concave interior surface. The upper wall 602 may be cylindrical, elliptic cylindrical, conical, frustoconical, spherical (e.g., hemisphere, partial sphere, etc.), or spheroidal (e.g., partial spheroid) in configuration.

In many embodiments, all or a portion of the upper wall 602 may be configured as a cylinder, with the upper wall having a circular transverse cross section of the same diameter along all or a portion of the height of the upper wall 602. In an alternate embodiment, all or a portion of the upper wall 602 of the mixing tank 600 may be configured as an elliptic cylinder, wherein the upper wall has an elliptical or oval transverse cross section along all or a portion of the height of the upper wall 602. In some embodiments, all or a portion of the upper wall 602 may have a conical or frustoconical shape or configuration. In still other embodiments, all or a portion of the upper wall 602 may have a spherical or spheroidal shape or configuration. In cases that employ elliptic features or configurations (i.e., elliptic cylinder, elliptic cone, spheroid, etc.), the ratio of the major axis to the minor axis of the elliptic shape or transverse cross section may range from greater than 1 to 1.5.

The diameter or width of the upper wall 602 across its largest dimension may be from 0.3 to 3 times or more the height of the upper wall 602. In particular embodiments, the upper wall 602 may have a diameter or width across its largest dimension of from 0.5 to 1.5 times the height of the upper wall 602, more particularly from 0.7 to 1.3 times the height of the upper wall 602. In certain embodiments, the upper wall may have a diameter or width across its largest dimension of at least, equal to, and/or between any two of 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7. 2.8, 2.9, and 3.0 times the height of the upper wall 602.

As shown in FIG. 16, the mixing tank 600 has a lower portion formed by a continuous lower wall 606 that is joined at its upper end 608 to the lower end of the upper wall 602. The upper end of the lower wall 606 will generally correspond in shape and size to the lower end of the upper wall 602. The lower wall 606 is also curved about its perimeter and surrounds the central axis 604. All or a portion of the lower wall 606 may be of a conical, frustoconical, spherical (e.g., hemisphere, partial sphere, etc.), or spheroidal (e.g., partial spheroid) shape or configuration.

As shown in FIG. 16, the lower wall 606 may be sloped downward along lines from its outermost perimeter or upper edge 608 where it joins the lower end of the upper wall 602 towards the central axis 604, with the diameter or width of the lower wall 606 decreasing along the central axis 604 towards its lower end. The angle of slope A of the lower wall 606 may be defined as the angle of a line drawn between the outer edge of the lower wall 606 where it joins the upper wall 602 to the innermost point or edge of the lower wall 606 at or nearest to the central axis 604. This angle of slope A may be from 5° to 60°. In some applications, the angle of slope A of the lower wall 606 may range from 10° to 45°. In certain embodiments, the angle of slope A of the lower wall 606 may be at least, equal to, and/or between any two of 5°, 6°, 7°, 8°, 9°, 10°, 11°, 12°, 13°, 14°, 15°, 16°, 17°, 18°, 19°, 20°, 20°, 21°, 22°, 23°, 24°, 25°, 26°, 27°, 28°, 29°, 30°, 31°, 32°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, and 60°. In most cases, the lower wall 606 is conical or frustoconical in shape to minimize sloshing of liquids as they are discharged from the tank 600. For those lower walls 606 having a spherical or spheroid shape, the lower wall 606 may have a concave inner surface with a degree of curvature to minimize sloshing and facilitate the flow of liquids downward toward the central axis 604. In some embodiments employing a curved lower wall 606, all or a portion of the lower wall 606 may have a radius of curvature of from 0.3 to 2 times the diameter or width of the lower wall 606 at its greatest dimension. In particular instances, the radius of curvature of may be at least, equal to, and/or between any two of 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 times the diameter or width of the wall 606 at its greatest dimension.

Referring to FIG. 17, a tank inlet 610 of the tank 600 is shown. The tank inlet 610 may be formed from a length of pipe or conduit that projects into the interior of the tank 600. The inlets 166, 170, 364, 366, previously described, may be the same as the inlet 610. One or more inlets 610 may be provided with the tank 600. If more than one inlet 610 is provided, these may be axially spaced apart along the height of the tank 600 at different positions and/or spaced circumferentially apart along the perimeter of the tank 600. In some embodiments, only a single inlet 610 is provided, which may be located along the upper half or lower half of the upper wall 602 of the tank 600. In certain embodiments, the inlet(s) 610 may be positioned along the upper wall 602 at a position along the height of the upper wall ranging from 0.2H to 0.8H, where H is the total height of the upper wall. In certain instances, the inlet 610 may be positioned along the height of the upper wall at a position at least, equal to, and/or between any two of 0.2H, 0.3H, 0.4H, 0.5H, 0.6H, 0.7H, and 0.8H. The inlet(s) 610 should be at a position below the upper liquid level of the tank 600 where it discharges directly into the swirling vortex of liquid once recirculation of liquids within the tank 600 has begun. This configuration allows the surrounding swirling vortex to create a suction pressure on the outlet of the inlet 610 that reduces the pumping requirements for recirculation of the liquid or mixture.

The tank inlet 610 is oriented so that a linear flow line 612 of the inlet 610 intersects the upper tank wall 602. The linear flow line 612 represents the overall direction of fluid flow from a center point of the tank inlet 610 immediately upon its discharge from the inlet 610 or its overall "point of aim" and may coincide with a central longitudinal axis of the pipe or conduit forming the inlet 610. As used herein, with respect to the orientation of the inlet 610 or orientation of the flow line 612, these expressions may be used interchangeably as the orientation of the inlet 610 will also correspond to the orientation of the flow line 612, or vice versa. The angle B is the angle between the flow line 612 and a tangential line 614 touching the interior of the tank wall 602 at the point where flow line 612 intersects the tank wall 602. The angle B may range from 0° to 45°. In certain embodiments, the angle B may be at least, equal to, and/or between any two of 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 30°, 31°, 32°, 33°, 34°, 35°, 36°, 37°, 38°, 40°, 41°, 42°, 43°, 44°, and 45°.

The inlet 610 may also be oriented so that the flow line 612 of the inlet is at angle of from ±0° to 70° from horizontal or a line perpendicular to the longitudinal axis 604. In many instances, the inlet 610 will be oriented so that the flow line 612 is perpendicular or close to perpendicular (i.e., ≤5°) to the longitudinal axis 604. In certain embodiments, the angle of orientation of the inlet 610 or flow line 612 may be at least, equal to, and/or between any two of 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, and 70° above or below horizontal or a line perpendicular to the longitudinal axis 604.

The tank inlet 610 is typically configured as a straight or linear length of pipe or conduit that projects into the interior of the tank 610 a selected distance. This distance of projection may be from 0 to 0.4 times the diameter or width of the tank at its widest point. In some applications, the pipe or conduit forming the inlet 610 may project a distance into the tank interior of at least, equal to, and/or between any two of 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, and 0.40 times the diameter or width of the tank at its widest point.

Figure 18:
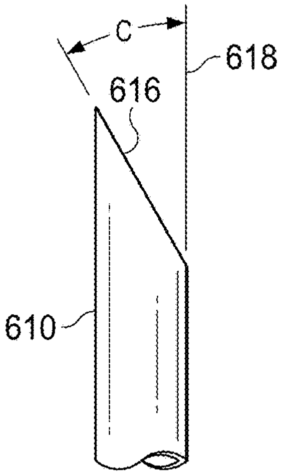
FIG. 18 is top plan view of a tank inlet conduit for the mixing tank of FIG. 16, showing an angle of bevel of the outlet end of the conduit.

As shown in FIG. 18, the end of the projecting pipe or conduit forming the inlet 610 may terminate at an angle at all or a portion of its end to provide a beveled end or mule-shoe or partial mule-shoe configuration, with the beveled or elliptical face 616 of the beveled end of the inlet 610 facing towards the interior wall 602 of the tank 600. All or a portion of the surface of the beveled face 616 may lie in a flat plane that that is oriented at bevel angle C that may be from 25° to 90° relative to a longitudinal axis 618 of the length of pipe or conduit forming the inlet 610, which may also correspond to the line of flow 612. In particular embodiments, the angle C may be from 30° to 60°, more particularly from 40° to 50°. A particularly useful angle for the angle C is 45°. In some applications, the angle of bevel C may be of at least, equal to, and/or between any two of 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 69°, 70°, 71°, 72°, 73°, 74°, 75°, 76°, 77°, 78°, 79°, 80°, 81°, 82°, 83°, 84°, 85°, 86°, 87°, 88°, 89°, and 90°. This beveled or mule-shoe configuration of the inlet 610 facilitates diverting or directing the discharged liquids towards or against the side of the tank 600.

The face 616 of the bevel is typically in a vertical plane orientated at 0° relative to vertical or the central axis 604 of the tank 600. In other instances, it may be oriented from 0° to 90° or less than 90° from vertical or the central axis 604, facing either upwards or downwards. In some applications, the plane of the bevel face 616 may be at least, equal to, and/or between any two of 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, and 90° from vertical or the central axis 604, and may face or be turned at such angle either upwards or downwards. In some embodiments, the face or edges of the bevel 616 may be arcuate or curved, which may be convex or concave.

Referring to FIG. 17, formed in the lower wall 606 is an opening 620 that forms an outlet of the tank 600. The opening 620 may be generally flush or level with the interior of the lower wall 606 and is sized and shaped to receive and discharge the liquid mixture within the tank 600 without substantially disrupting the swirling liquid vortex once it is formed within the tank 600. This may include an elongated shape of the opening 620 that extends radially outward from a position at or near the central axis 604 towards the outer perimeter 610 of the lower wall 606. In particular embodiments, the opening 620 may have a quadrilateral configuration, such as rectangular, trapezoidal, parallelogram, rhomboidal, square, kite, etc. configuration. Other shapes for the opening 620 may be used as well, such as polygonal, oval, etc. The opening 620 is typically non-circular. If the opening 620 is circular, the center of such circular opening will be offset or radially spaced apart from the central axis 604 or from the lowest point of the lower wall 606. The opening can include a combination of straight and/or arcuate side edges, with the arcuate side edges being convex and/or concave side edges.

Figure 19:
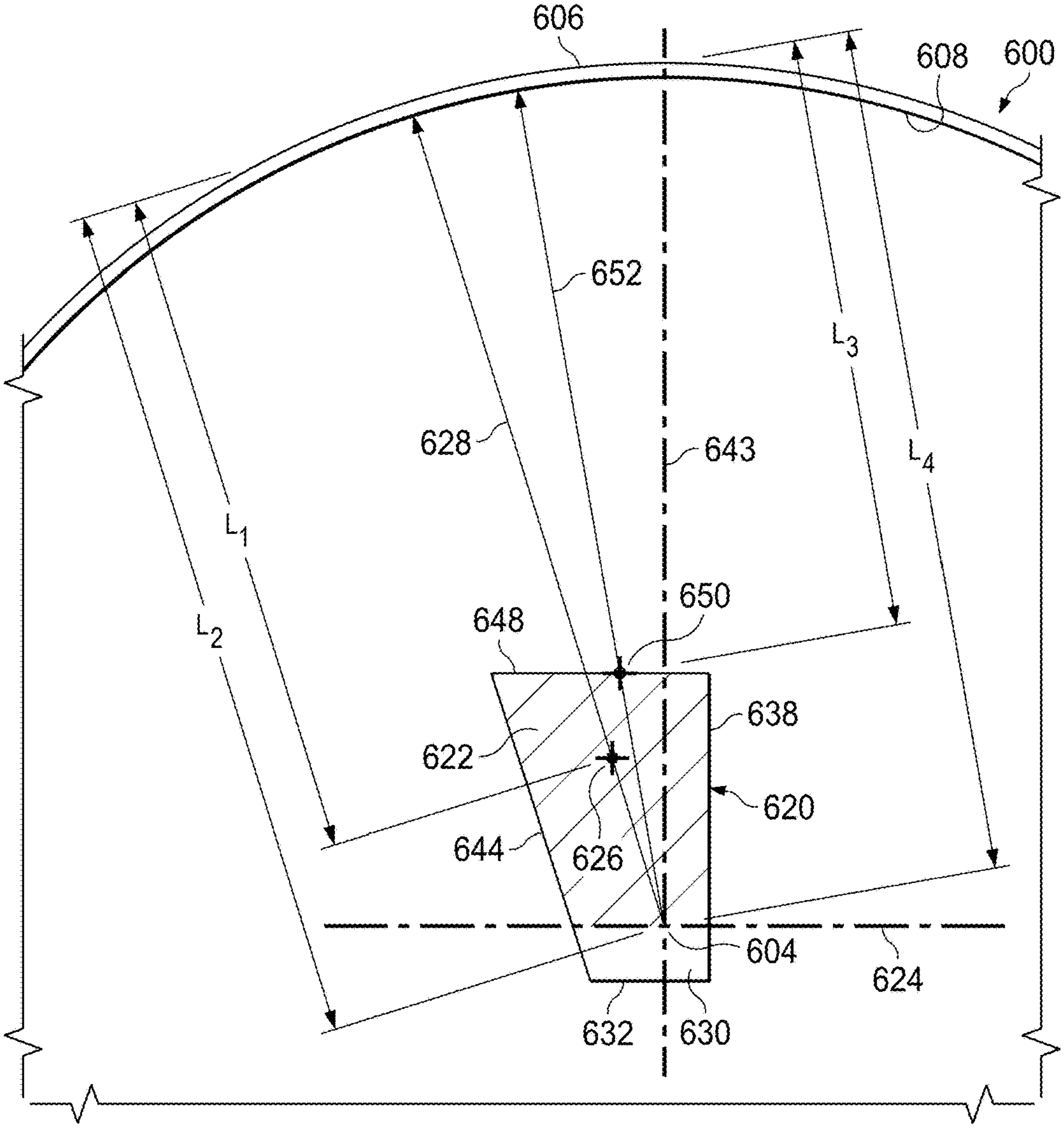
FIG. 19 is a schematic representation of a tank outlet opening formed in a lower tank wall of the mixing tank of FIG. 16, showing a centroid and outermost point of an offset portion of the opening relative to the outer perimeter of the lower tank wall.

As shown in FIG. 19, all or a major portion of the opening 620, as indicated by the shaded area 622, is off center or offset from central axis 604 of the lower wall 606 or to one side of a center line 624 of the tank wall 606 that passes through the central axis 604. Thus, the geometric center or centroid 626 of the area 622 of the opening 620 in the tank wall 606 that is positioned to one side or spaced away from the central axis 604 or center line 624 is spaced apart from the central axis 604.

In certain embodiments, the geometric center or centroid 626 of the offset portion 622 of the opening 620 that is spaced to one side of the central axis 604 or center line 624 may be radially spaced from the outer perimeter 608 a distance $L_1$, where $L_1$ is from >0 to 0.99 times the length $L_2$ of a radial line 628 that extends perpendicularly from the central axis 604 across the geometric center 626 to the outer perimeter 608 of the lower tank wall 606. In particular instances, the geometric center 626 of the area of that portion 622 to one side of the axis 604 or center line 624 may be spaced a distance from the outer perimeter 608 a distance $L_1$ of at least, equal to, and/or between any two of 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.77, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, and 0.99 times $L_2$.

As is shown in FIGS. 17 and 19, in certain embodiments, a minor portion 630 of the opening 620 may underlie and extend across the center of the tank lower wall 606 on the other side of the center line 624 opposite the portion 622 of the tank wall 606 or central axis 604 a short distance to facilitate complete draining of the tank 600. In such cases, the end edge 632 of this minor portion 630 of the opening 620 constitutes an inner edge of the opening 620.

In other embodiments, the entire opening 620 may be spaced apart from the central axis 604 or center line 624 at a position between the central axis 604 and the outer perimeter 608 of the lower wall 606 so that the entire opening 620 constitutes the offset portion 622 that is located to one side of the central axis 620 or center line 624. In such cases, the end edge 632 of the opening 620 nearest the central axis 604 may be radially spaced from the central axis 604 a distance from 0.01 to 0.7 times the length of a line extending across the innermost edge 632 of the opening 620 and between the outer circumferential perimeter 608 of the lower wall 606 to the central axis 604. In certain instances, the innermost edge 632 of the opening 620 nearest the central axis 604 may be radially spaced from the central axis 604 a distance of at least, equal to, and/or between any two of 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, and 0.70 times the length of a line extending across the innermost edge of the opening 620 and between the outer circumferential perimeter of the lower wall 606 to the central axis 604.

In cases where portions of the opening 620 extend across the central axis 604 or center line 624 to form both portions 622, 630, the portion 622 may constitute from 51% to 99% of the area of the opening 620 that is radially spaced to one side of the central axis 604 or center line 624. In some applications, where portions of the opening 620 extend across the central axis 604 or center line 624, the area of the portion 622 of the opening 620 that is offset to one side of the central axis 604 or the center line 624 may be at least, equal to, and/or between any two of 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%.

As shown in FIG. 16, this offset configuration of the opening 620 ensures that the opening or outlet 620 or a major portion thereof directly underlies the swirling liquid vortex 634 along the lower wall 606. When the swirling liquid vortex 634 is formed in the tank 600, a central vortex core 636 is formed that is non-liquid or substantially free of liquid (i.e., free from liquid other than small or minor amounts of liquid spray, droplets, mist, etc., which may still be present in the core 636). In most applications that are open to the atmosphere, the non-liquid vortex core 636 will be an air core. Typically, this core 636 extends along the central axis 604 to the bottom of the tank 600. If the majority of the opening or outlet 620 were directly centered at or on the axis 604, then the outlet 620 would primarily be open to or underlie the non-liquid core 636 so that large quantities of air or gas are discharged through the outlet 620 from the tank 600 and introduced into recirculation pumps, such as the slurry or recirculation pumps 112, 310, 312, previously described. Such large quantities of air discharged from the tank 600 with the liquid mixture can be detrimental, reducing the efficiency of the pump and also affecting the quality and density of the liquid mixture that is being formed due to entrained air or gas within the liquid.

In certain applications, therefore, the outlet 620 may be positioned and configured so that no or only a small or minor portion of the outlet 620 underlies the center of the tank 606 wall 606 or the air or gas core 636, so that little, if any, air or gas from the core 636 passes or is discharged through the outlet 620. Depending upon the application and liquid mixtures being prepared, the position of the opening 620 may vary due to differences in the liquid-free core 636 that is formed in the swirling liquid vortex 634.

The offset opening 620 also overcomes those issues of conventional mixing tanks where swirling liquids are discharged from a central opening positioned at the bottom or lowermost portion of the tank. With the outlet of the tank located or centered at the very center of the bottom of the tank in such conventional systems, not only does liquid not enter the outlet due to the non-liquid vortex that may be formed at the center of the tank, but any downward liquid velocity at or near the center of the tank is very low. This is due to the centrifugal forces from the swirling motion of the liquids that force the liquids radially outward towards the tank walls and away from any centrally located outlet. As a result, the swirling liquids tend to stay in the tank when there is a high swirling velocity, so they are not effectively discharged from the tank.

For liquids to be discharged effectively from a central bottom opening or outlet in conventional systems, the swirling velocity must be significantly reduced so that the outward centrifugal forces are reduced, and the downward velocity of the liquids are increased. Reducing the swirling velocity, however, reduces the effectiveness of the mixing as the liquids are removed and recirculated. In contrast, by positioning all or a major portion of the opening 620 off center along the lower wall 606, more liquid is received and discharged through the outlet 620 so that a high swirling velocity can be maintained throughout mixing and recirculation.

The opening 620 is also configured in a way that increases the amount of liquid discharged from the tank 600 without significantly interfering with the swirling liquid vortex that is formed therein. Referring to FIG. 19, the outlet 620 is configured with an elongated upstream edge 638 of the opening 620 or the offset portion 622 of the opening 620. All or portions of the upstream edge 638 may be straight or linear. The upstream edge 638 or portions thereof may also be non-linear. This may include curved or arcuate portions, which may be convex and/or concave, undulating, etc.

Figure 20:
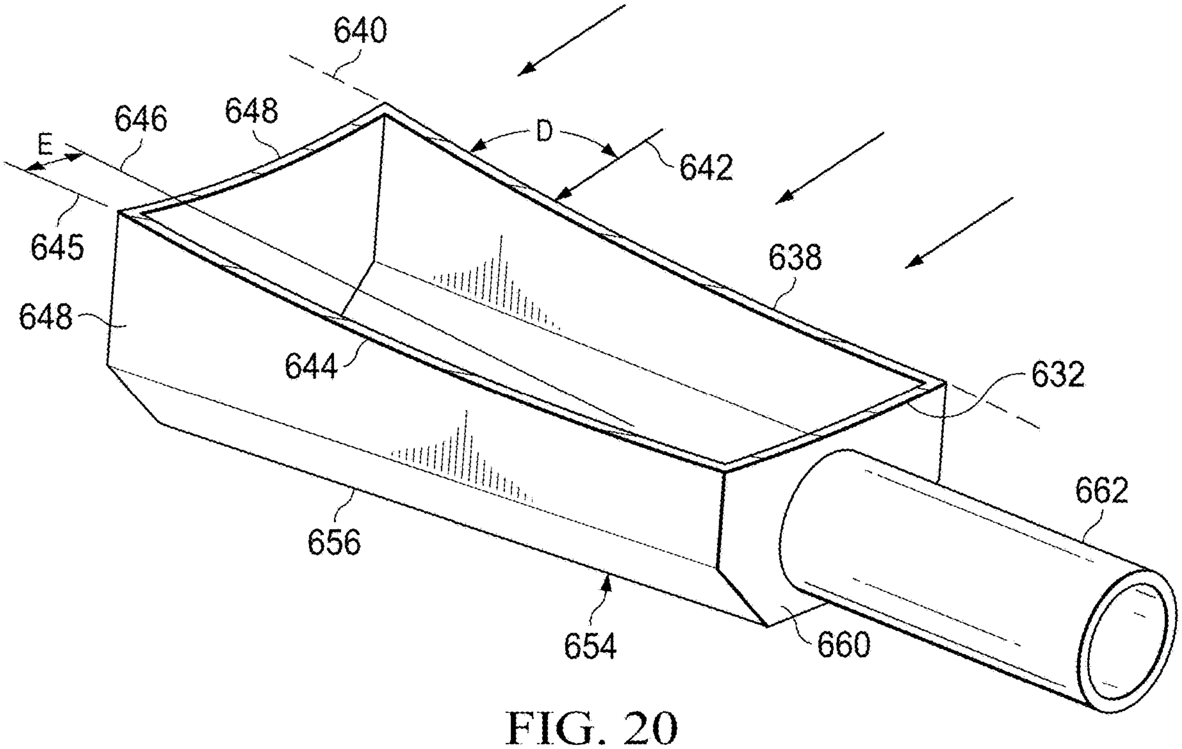
FIG. 20 is a perspective view of a sump box that is coupled to the tank outlet opening of the tank of FIG. 16.

As shown in FIG. 20, all or a major portion of the upstream edge 638 of the outlet 620 may extend or coextend along a straight line 640 that extends between the innermost and outermost ends of the upstream edge 638. The line 640 may be oriented at an angle D from 60° to 120° relative to the lines of fluid flow 642 of the swirling vortex that immediately intersect the upstream edge 638. Typically, the upstream edge angle D will be at or near 90° or perpendicular to the fluid flow at the upstream edge 638 and may coincide with a line parallel to a radial line 643 extending from the central axis 604. In certain embodiments, the upstream edge angle D may be at least, equal to, and/or between any two of 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, and 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, and 120° relative to the lines 642 of fluid flow.

In some embodiments, the overall linear length of the upstream edge 638 as measured along the line 640 may be at least, equal to, and/or between any two of 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, and 0.80 times the length of the line 640 as it extends between the outer circumferential perimeter 608 of the lower wall 606 to the central axis 604.

A downstream edge 644 of the offset portion 622 of the opening 620 is circumferentially spaced downstream relative to the direction of the vortex fluid flow from the upstream edge 638. All or portions of the downstream edge 644 may be straight or linear or non-linear (e.g., curved, undulating, etc.). The downstream edge 644 of the portion 622 of the outlet 620, however, may extend or coextend along a straight line 645 that extends between the innermost and outermost ends of the downstream edge 644. The downstream edge 644 or line 645 may be oriented at an angle E from −45° to 45° relative to a line 646 that is parallel with the line 640 of the upstream edge 638. In particular embodiments, the angle E may be at least, equal to, and/or between any two of 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, and 45°. A wider end of the opening 620 is created where the angle E is greater than 0°. This may accommodate the larger area of the lower wall 606 as the area of the lower wall 606 increases towards its outer perimeter 608 and facilitates collection of higher volumes of the swirling liquids of the vortex. The downstream edge 644 may be flush with the lower wall 606 in some embodiments. In other embodiments, a small projecting lip, ridge, fin, vane or other projection may be provided along all or a portion the downstream edge 644 to facilitate directing the swirling liquids through the opening 620.

An outer edge or end 648 of the opening 620 extends between the upstream and downstream edges 638, 644 and may extend along linear or radially outward and/or radially inward projecting arcuate or curved lines extending between the ends of the upstream and downstream edges 638, 644. The outermost point 650 of the offset portion 622 or outer end edge 648 of the opening 620 may be spaced a distance $L_3$ from the outer perimeter 608 of the tank wall 606, as measured along the radial line 652 that extends perpendicularly from the central axis 604 to the outer perimeter 608 and across the outermost point 650 of the outer edge 648, the line 652 having a length $L_4$. The distance $L_3$ may be from 0 to 0.9 times the length ($L_4$) of line 652. In particular applications, the distance $L_3$ of the outermost point 650 of the offset portion 622 may be at least, equal to, and/or between any two of 0.0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, and 0.90 times $L_4$.

The total area of the opening 620 formed in the lower wall 606 may be from 0.1% to 10% of the total surface area defined by the lower wall 606, including that portion of the lower wall 606 where the opening is formed. In certain instances, the total area of the opening 620 may be at least, equal to, and/or between any two of 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, and 10.0%, of the total surface area defined by the lower wall 606, including that portion of the lower wall 606 where the opening 620 is formed.

As described previously, a sump or sump box 654 is provided with the mixing tanks and is coupled to the lower wall 606 over the outlet or opening 620 for collecting the discharged or withdrawn portion of the of the swirling liquid that passes through the opening 620. The upper end perimeter of the sump box 654 may coincide or coextend with or along the side edges of the opening 620. In other embodiments, the upper end perimeter of the sump box 654 may be larger than the opening 620, with the edges of the upper perimeter of the sump box 654 being outwardly spaced from the edges of the opening 620 so that the opening 620 is fully encompassed by the upper opening of the sump box 654 to facilitate receiving a greater volume of liquid within the sump 654. The sump box 654 has a lower floor 656 with upward extending sidewalls 658 that extend from the floor 656. The sidewalls 658 couple to the lower wall 606 and may form a fluid tight seal around the opening 620. As shown, the floor 656 of the interior of the sump 654 may be sloped or have an arcuate concave wall to facilitate the flow of liquids out of the sump 654. The sump box 654 and/or the floor 656 may be angled or sloped downward toward an outlet end 660 to facilitate the flow and drainage of liquids from the sump 654 to a discharge pipe or conduit 662 at the outlet end 660.

The discharge pipe or conduit 662 may form or be in fluid communication with the recirculation line or suction lines, such as the lines 164, 400, 402, on the suction side of the recirculation pumps 112, 310, 312, respectively, as previously described. The recirculation pump for the tank 600, such as the pumps 112, 310, 312, will typically be at or below the tank 600 and/or sump 654 level so that a hydrostatic head is continuously maintained during pumping and recirculation of the liquid mixture. Additionally, the pump inlet of the recirculation pump may be in close proximity to the sump box 654 so that the distance between the pump inlet and sump 654 is minimized. This distance may be from 5 ft, 4 ft, 3 ft, 2 ft, or 1 ft or less. This reduces the amount of unmixed solids/particulate to be pulled from the tank and then sheered via the pump impellers. This reduces the energy it takes to pull liquids and unmixed particulate out of the mixing tank so that pump efficiencies remain high and reduce stress on the pump motors.

As has been described previously, during operation, the tank 600 may be initially filled with liquid water, solvent or other carrier liquid used in forming the liquid slurry, mixture or solution. Non-limiting examples of suitable liquids for such purposes include fresh water, distilled water, sterile water, sea water, aqueous brines, aqueous liquids, hydrocarbon liquids, etc., or combinations of such liquids. The liquid is then recirculated, such as with the recirculation pumps 112, 310, 312, through the tank 600, being discharged at a sufficient flow rate into the tank interior through the tank inlet 610 so that liquid discharged from the inlet 610 is directed towards the upper wall 602 and causes the liquids within the tank 600 to form a swirling liquid vortex that swirls around the central axis 604.

As shown in FIG. 16, the swirling liquid flow causes the liquids to be flung outward against the walls of the tank 600 so that the liquid-free vortex core 636 is formed. The core 636 may have a conical or cone shape that extends along the central axis 604 from the upper liquid level of the vortex 634 down to or near the bottom of the lower wall 606 at or near the central axis 604. Because the offset portion 622 of the tank outlet 620 is offset to one side from the center and forms a majority of the outlet 620, air or gases from the liquid-free core 636 are prevented from entering the sump 654 or enter at reduced amounts compared to those systems where the outlet is located in the center.

In some instances, the liquid-free core 636 may extend downward from the upper liquid level of the vortex 634 to a depth of 0.4 to 1 times the height of the liquid level vortex 634 within the tank 600. Where the depth of the core 636 equals 1 times the height of the liquid level vortex 634, the core 636 extends all the way to the bottom of the tank 600. In certain embodiments, the liquid-free core 636 may extend from the upper liquid level of the vortex 634 to a depth of at least, equal to, and/or between any two of 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, and 1 times the height of the liquid level vortex 634 within the tank 600.

When powder or particulate (e.g., cement) or liquid materials to be mixed are introduced into the tank, it may be beneficial to introduce them at the upper liquid level at or near the interface of the swirling liquid vortex 634 and the liquid-free core 636. This is because the greatest liquid velocity may be encountered in this area and ensures that the materials are more thoroughly mixed as they are circulated in the tank. A dispersing cone, such as the dispersing cone 420 (FIG. 13) positioned above the center of the tank 600 may facilitate directing such materials at this interface. In other embodiments, however, the materials can be introduced at other areas, such as on the suction side or discharge side of the recirculation pumps.

As the materials are mixed, the properties and characteristics can be continuously or periodically measured, such as with the densometers 320, 322, while mixing is occurring within the system until the desired quality or characteristic is achieved. Other sensors can be used for evaluating the mixture to determine other properties and characteristics while the liquid remains in the system. This can also be confirmed through other testing by removing a sample of the mixture from the system and using those techniques commonly used for the evaluating the mixture being prepared, if necessary.

Because of the configuration of the mixing system, very fast mixing times can be achieved utilizing the system. Additionally, because the tank inlet 610 is located at a position below the liquid level of the swirling liquid and not located at the upper end of the tank, as in conventional system, the swirling liquid vortex that is formed creates a suction effect against the tank inlet 610 reducing injection pressures wherein the pump requirements may merely be those necessary to overcome pipe friction of the liquids. As an example, in preparing a cement slurry in practice, once the swirling vortex was formed, the injection pressures at the tank inlet can be very low, at from 2 psi to 4 psi in some instances. This contrasts with those conventional systems, which recirculate the cement slurry over the top of the mixing tank. In such cases, the injection pressures in such conventional mixing systems typically range from 30 psi to 120 psi.

Once the desired properties of the liquid mixture are achieved, the mixture can be discharged, such as through the discharge 174, 394, previously described, for use and/or storage. Additionally, where two or more tanks are employed, such as with the system 300, the tanks can be used sequentially so that a quantity of the prepared liquid mixture, such as cement slurry, is always prepared and available for use from one tank while another is being prepared for later use. Alternatively, multiple tanks can be used to simultaneously prepare liquid mixtures, such as where large amounts of the liquid mixture are necessary that may exceed the volume or capacity of one tank.

Figure 21:
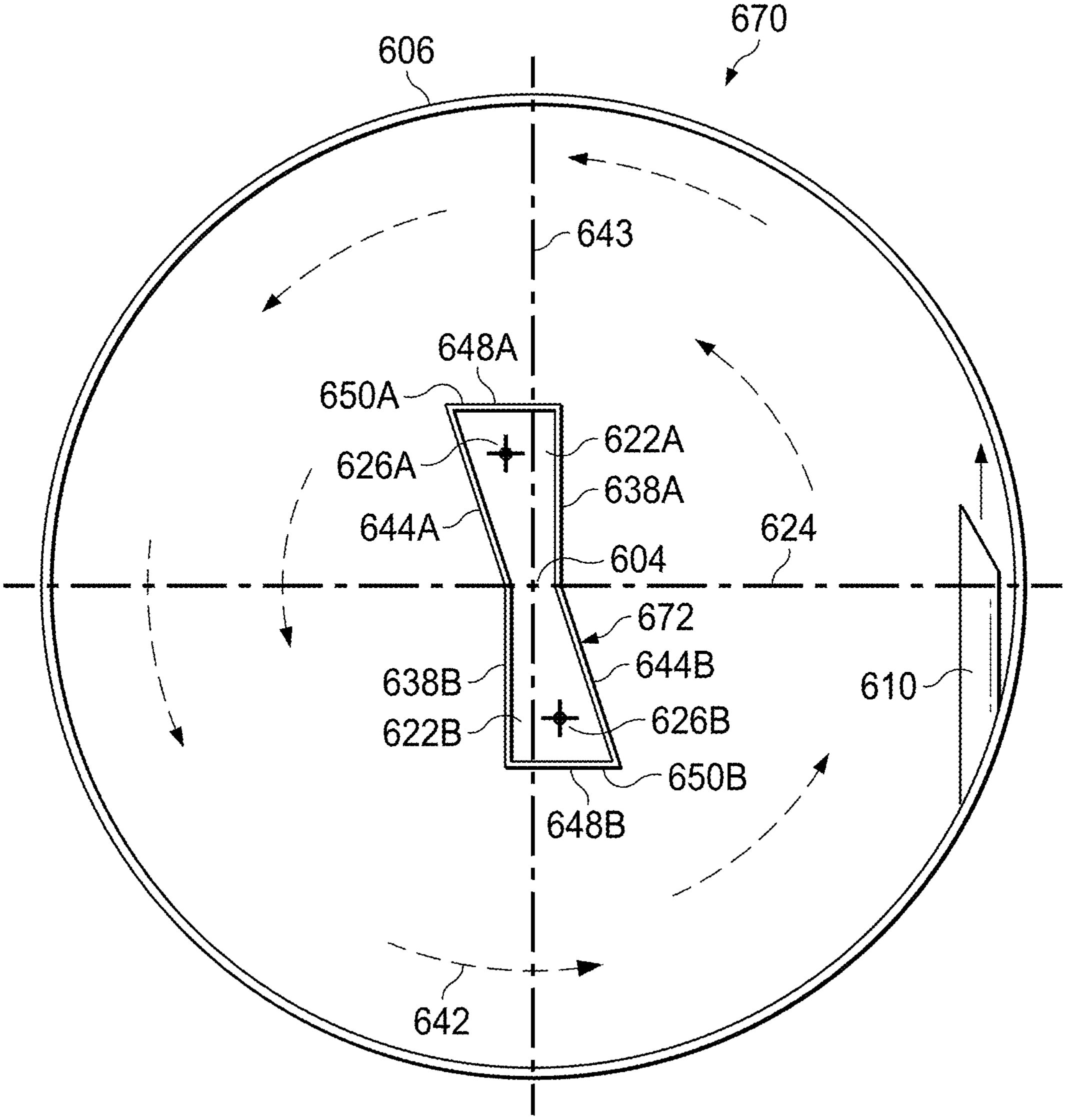
FIG. 21 is a top plan of an alternate embodiment of a mixing tank having dual offset portions of a tank outlet opening constructed in accordance with particular embodiments of the invention.

Referring to FIG. 21, another embodiment of tank 670 is shown. The tank 670 is similar to the tank 600, with similar components labeled with the same reference numerals. The tank 670 differs in that it utilizes an opening 672 or openings comprised of two or more offset portions 622A, 622B. In the embodiment shown, there are two offset portions 622A, 622B. Each offset portion 622A, 622B may be shaped and configured similarly to the offset portion 622 of the tank 600 previously described. If necessary, the offset portions 622A, 622B may be sized and configured to provide a total area of the opening 672 that is the same or similar to the opening 620 of tank 600, i.e., from 0.1% to 10% of the total surface area defined by the lower wall 606 of the tank 670. Corresponding structures of the opening 672 to those of opening 620 are labeled with the same reference numerals and are designated with either an A or B, as the case may be, to show correspondence to the offset portions 622A, 622B, respectively.

As shown, the offset portions 622A, 622B are circumferentially spaced apart 180° around the central axis 604 or center line 624. In other embodiments, the offset portions 622A, 622B may be spaced apart less than 180°. While two offset portions 622A, 622B are shown, in other embodiments there may be more than two offset portions (e.g., 3, 4, 5, etc.). The offset portions may be circumferentially spaced apart an equal or a non-equal distance from one another. In certain embodiments, the offset portions 622A, 622B may be circumferentially spaced apart from one another at least, equal to, and/or between any two of 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, and 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152°, 153°, 154°, 155°, 156°, 157°, 158°, 159°, 160°, 161°, 162°, 163°, 164°, 165°, 166°, 167°, 168°, 169°, 170°, 171°, 172°, 173°, 174°, 175°, 176°, 177°, 178°, 179°, and 180°.

The operation of the tank 670 is the same or similar to that of tank 600, previously described.

Figure 22:
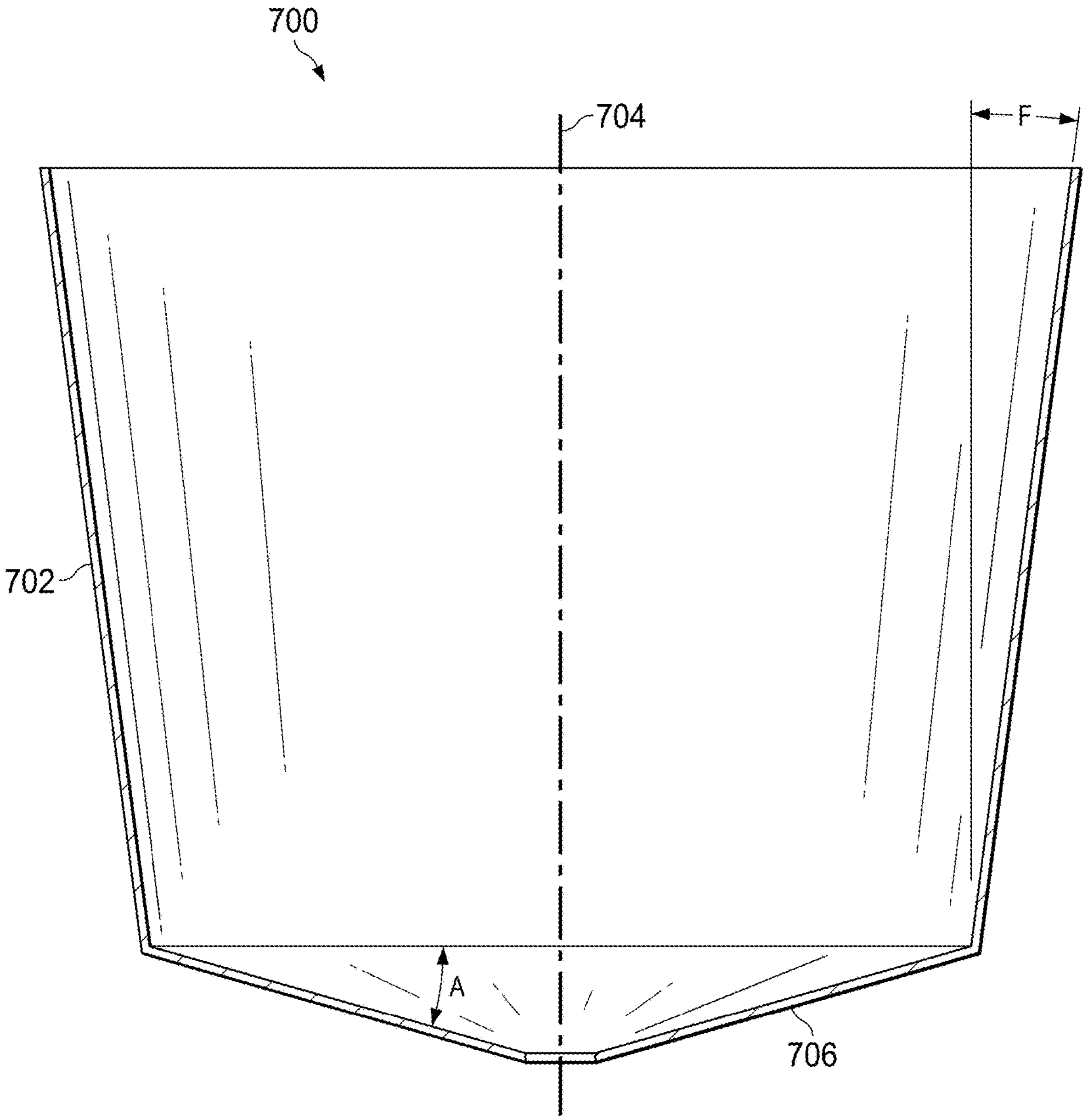
FIG. 22 is an elevational cross-sectional view of a further embodiment of a mixing tank for mixing liquids employing a frustoconical upper wall and constructed in accordance with particular embodiments of the invention.

Referring now to FIG. 22, another embodiment of a mixing tank 700 is shown. The mixing tank 700 is similar to tanks 600 or 670 and those tanks previously described. The tank 700 differs in that the upper tank wall 702 is frustoconical in shape. The upper tank wall 702 may be sloped inward towards the bottom of the tank 700 at an angle F relative to the central axis 704 or line parallel to the central axis 704. The angle F may be from >0° to 45°. In certain embodiments, the angle F may be at least, equal to, and/or between any two of >0, 0.1°, 0.2°, 0.3°, 0.5°, 0.6°, 0.7°, 0.8°, 0.9°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, and 45°.

The lower wall 706 of tank 700 may be configured the same or similarly to the lower wall 606 of tank 600, with the angle A being the same for the lower wall 706 as that for the lower wall 606.

In systems where the entire tank is conical, frustoconical, spherical, spheroidal, etc., so that there is no significant demarcation where the upper and lower wall are joined together, those specifications with respect to the upper and lower walls that have been previously described should be applied to the entire wall as being either an upper wall or a lower wall, as the case may be.

The mixing system of the invention can be used for mixing liquids for a variety of industries and applications. These can include the mixing of powdered cement for use in oil and gas well construction and plugging, as has already been described. The mixing system can be used for mixing oil and gas well fracking materials for various fracturing fluids, and for mixing friction reducing agents, such as polyacrylamides, used in well fluids. The system may be used for mixing or preparing oil and gas refining materials, for mixing chemicals and chemical processing materials, for mixing road and building construction materials, for mixing agricultural materials, for mixing pharmaceutical materials, for mixing fire-retardant materials, for mixing food and beverage materials, etc.

While the invention has been shown in only some of its forms, it should be apparent to those skilled in the art that it is not so limited but is susceptible to various changes and modifications without departing from the scope of the invention. Accordingly, it is appropriate that the invention be construed broadly.

The following examples serve to further illustrate various embodiments and applications.

EXAMPLES

Example 1

A slurry of Class C cement was formed utilizing a mixing system similar to those described. The target density of the neat cement was 14.8 ppg. The mixing tank was a vertical tank having a cylindrical upper portion or wall 6 ft tall with an inside diameter of approximately 6 ft. The lower wall was a conical wall having an overall vertical height of 2 ft and an angle of slope A from the outer edge of approximately 33.7°.

The tank inlet was a 4-inch diameter pipe having a 45° bevel at the end that was vertically oriented so that the face of the bevel faced the wall of the tank. The inlet projected into the tank approximately 18 inches and the angle B of flow with respect to the interior of the tank as approximately 23°. The height of the center of the inlet was approximately 36 inches from the upper end of the cylindrical tank upper wall.

The outlet of the tank was configured similarly to that shown in FIGS. 16-17 and 19-20. For ease of reference, the same reference numerals are used for corresponding features as those used for tank 600. A minor portion 630 of the tank outlet opening 620 overlapped the center of the tank to facilitate complete draining of the tank. The tank outlet had an inner side edge 632 on the minor portion 630 having an overall linear length of approximately 9.75 inches that was spaced approximately 8 inches to one side from the center line 624 or central axis 604 of the tank opposite the major offset portion 622. The upstream edge 638 of the tank outlet was a generally straight or linear edge extending radially outward from the inner edge 632 to the outer edge 648 of the opening 620 a total distance of approximately 21 inches. That portion of the upstream edge 638 on the offset portion 622 was generally perpendicular to the direction of swirling fluid flow and was positioned approximately 2 inches upstream from the central axis. Approximately 13 inches of the upstream edge 638 was located on the offset portion 622 of the opening to one side of the central axis 604 or center line 624 of the lower tank wall. The downstream edge 644 of the opening 620 on the offset portion 622 was a generally straight or linear edge extending from the inner edge 632 to the outer edge 648 and also had a length of approximately 21 inches and was generally parallel or oriented at an angle E of 0° relative to the upstream edge 638. The centroid of the offset portion 622 of the opening 620 was located a distance $L_1$ from the outer perimeter of the lower tank wall that was equal to approximately $0.82 \cdot L_2$. The outermost point 650 of the outer edge 648 was located a distance $L_3$ from the outer perimeter that was equal to approximately $0.63 \cdot L_4$. The total area of the outlet was approximately 225.75 $in^2$, with approximately 153.75 $in^2$ or 68.1% of the open area of the outlet constituting the offset portion 622 of the outlet that is offset and located to one side the central axis 604 or center line 624 of the lower wall. The total area of the opening 620 was 4.6% of the total surface area defined by the lower wall 606, including that portion of the lower wall 606 where the opening 620 is formed.

The tank was initially filled with approximately 252 gallons of clean water to a height of approximately 22 inches along the upper tank wall before recirculation. The water was circulated through the mixing tank utilizing a 6"×6" non-VSD pump powered by a 20 HP electrical motor. The recirculation rate was approximately 504 gal/min. The suction side of the pump inlet was located at a position below the sump and tank outlet and was positioned less than 4 ft from the sump.

As the water was circulated, a swirling liquid vortex was formed in the tank. The end of the tank inlet pipe was located at a position within the liquid vortex so that a suction pressure was exerted by the vortex on the tank inlet. As the clean liquid swirling vortex was formed, the injection pressure at the tank inlet ranged from 9 psi initially as the vortex was being formed to 2 psi after the vortex was formed.

Once the clean water vortex was formed, approximately 3,760 lbs of Class C cement was introduced into the tank from the top of the tank utilizing a dispersing cone similar to the dispersing cone 420 previously described so that the cement was introduced into the swirling liquid vortex near the non-liquid core. The pump injection pressures at the tank inlet after the cement was added ranged from 5 psi to 20 psi, with the higher pressures occurring after cement was withdrawn from the tank so that that the liquid vortex dropped below the level of the tank inlet.

An inline Redmeter™ non-nuclear densometer was used at the recirculation pump outlet to continuously monitor the density of the cement slurry as it was circulated. As measured with the densometer, the cement slurry density of approximately 14.8 ppg was reached and maintained as it was circulated through the system. This cement density was confirmed upon testing a sample using a pressurized mud scale. The target cement density was maintained as it was offloaded from the system.

We claim:

1. A method of forming a liquid mixture comprising:

in a first mixing tank having a continuously curved upper wall and a lower wall having a central axis and a perimeter that joins a lower end of the upper wall to define a tank interior, the lower wall comprising a continuously curved surface tapering inward from the upper wall along the perimeter, introducing a liquid stream comprising at least a first liquid into the tank interior through a tank inlet so that the liquid stream is directed towards the upper wall, the liquid stream being introduced through the tank inlet at a flow rate and an angle relative to the upper wall sufficient to create a swirling liquid within the tank interior, the swirling liquid forming a liquid vortex having a vortex core that is substantially free of liquid for at least a portion of the height of the mixing tank;

withdrawing a portion of the swirling liquid through a tank outlet formed by at least one opening in the lower wall, the opening having an upstream edge and a downstream edge relative to the swirling liquid flow that is circumferentially spaced from the upstream edge, the downstream edge extending along a line that is oriented at an angle from −45° to 45° relative to a line that extends along the upstream edge, at least a portion of the opening being an offset portion that is positioned to one side of the central axis of the lower wall, the geometric center of the offset portion of the opening being spaced a distance $L_1$ from the perimeter that is from >0 to 0.99 times the length of a radial line $L_2$ extending from the perimeter across the geometric center of the offset portion to the central axis of the lower wall, and wherein a radial outermost point of the offset portion of the opening is spaced a distance $L_3$ from the perimeter of the lower tank wall, as measured along a radial line having a length $L_4$ that extends from the perimeter through the outermost point of the offset portion to the central axis, the distance $L_3$ being from 0 to 0.9 times $L_4$, and circulating the withdrawn portion as all or a part of the liquid stream introduced into the tank inlet; and combining a second material to be mixed with the first liquid, the second material being mixed with the first liquid in the swirling liquid flow within the tank interior to form a first liquid mixture comprising the first liquid and second material.

2. The method of claim 1, wherein:

the second material is a powder or particulate solid material.

3. The method of claim 1, wherein:

the second material is a liquid.

4. The method of claim 1, wherein:

the second material is at least one of a powdered cement, an oil or gas well material, an oil and gas well fracking material, a friction reducing agent, an oil and gas refining material, a chemical, a chemical processing material, a road and building construction material, an agricultural material, a pharmaceutical material, a fire-retardant material, and a food or beverage material.

5. The method of claim 1, wherein:

the first liquid is at least one of fresh water, sea water, an aqueous brine, an aqueous liquid, and a hydrocarbon liquid.

6. The method of claim 1, wherein:

the tank inlet is oriented along a flow line that intersects the upper wall at an angle of from 0° to 30° relative to a tangential line touching the upper wall at the point where the flow line intersects the upper wall.

7. The method of claim 1, wherein:

the second material is introduced into the liquid vortex of the swirling liquid.

8. The method of claim 1, wherein:

$L_1$ is from 0.05 to 0.95 times $L_2$.

9. The method of claim 1, wherein:

the distance $L_3$ is from 0 to 0.8 times $L_4$.

10. The method of claim 1, wherein:

the opening has an elongated shape oriented in a radial direction.

11. The method of claim 1, wherein:

a sump box is coupled to the tank outlet for collecting the withdrawn portion of the swirling liquid, the sump box being angled downward to an outlet of the sump box.

12. The method of claim 1, further comprising:

delivering at least a portion of the first liquid mixture to a selected area of use; and preparing a second liquid mixture in a second mixing tank using the method of claim 1, at least a portion of the second liquid mixture being delivered to the selected area of use after delivery of the at least a portion of the first liquid mixture.

13. A system for forming a liquid mixture comprising:

a first mixing tank having a continuously curved upper wall and a lower wall having a central axis and a perimeter that joins a lower end of the upper wall to define a tank interior, the lower wall comprising a continuously curved surface tapering inward from the upper wall along the perimeter;

a pump having a pump intake and pump discharge for pumping liquids of the system at selected flow rates;

a tank inlet in fluid communication with the pump discharge for introducing a liquid stream comprising at least a first liquid from the pump discharge into the tank interior, the tank inlet configured to cause the liquid stream from the pump discharge to be directed at a first selected flow rate towards the upper wall of the first mixing tank to create a swirling liquid flow within the tank interior so that the swirling liquid forms a liquid vortex having a vortex core that is substantially free of liquid for at least a portion of the height of the mixing tank;

at least one tank outlet opening formed in the lower wall, at least a portion of the opening being an offset portion that is positioned to one side of the central axis of the lower wall, the tank outlet opening having an upstream edge and a downstream edge relative to the swirling liquid flow that is circumferentially spaced from the upstream edge, the downstream edge extending along a line that is oriented at an angle from −45° to 45° relative to a line that extends along the upstream edge, the geometric center of the offset portion of the opening being spaced a distance $L_1$ from the perimeter that is from >0 to 0.99 times the length of a radial line $L_2$ extending from the perimeter across the geometric center of the offset portion to the central axis of the lower wall, and wherein a radial outermost point of the offset portion of the opening is spaced a distance $L_3$ from the perimeter of the lower tank wall, as measured along a radial line having a length $L_4$ that extends from the perimeter through the outermost point of the offset portion to the central axis, the distance $L_3$ being from 0 to 0.9 times $L_4$, for withdrawing a portion of the swirling liquid within the tank interior, the tank outlet opening being in fluid communication with the pump intake of the pump for circulating the withdrawn portion as all or a part of the liquid stream introduced into the tank inlet; and a second material inlet in communication with at least one of the tank interior, the pump intake, and the pump discharge so that a second material can be introduced and mixed with the first liquid in the swirling liquid flow within the tank interior to form a liquid mixture comprising the first liquid and second material.

14. The system of claim 13, wherein:

the tank inlet is oriented along a flow line that intersects the upper wall at an angle of from 0° to 45° relative to a tangential line touching the upper wall at the point where the flow line intersects the upper tank wall.

15. The system of claim 13, wherein:

the second material inlet is in communication with an upper end of the tank interior so that the second material is introduced into the liquid vortex of the swirling liquid.

16. The system of claim 13, wherein:

$L_1$ is from 0.05 to 0.95 times $L_2$.

17. The system of claim 13, wherein:

a sump box is coupled to the tank outlet opening for collecting the withdrawn portion of the swirling liquid, the sump box being angled downward to an outlet of the sump box.

18. The system of claim 13, further comprising:

a sensor for measuring properties of the liquid mixture while the liquid mixture remains within the system.

19. The system of claim 13, wherein:

the distance $L_3$ is from 0 to 0.8 times $L_4$.

20. The system of claim 19, wherein:

the tank outlet opening has an elongated shape oriented in a radial direction.

* * * * *